(12) United States Patent
Pilgrim et al.

(10) Patent No.: US 7,818,106 B1
(45) Date of Patent: Oct. 19, 2010

(54) MOTOR VEHICLE POWER MANAGEMENT SYSTEM

(75) Inventors: Michael Pilgrim, Dublin, OH (US); John Vilkinofsky, Dublin, OH (US); Nathaniel W. Diedrich, Dublin, OH (US); Andrew T. Goeppner, Plain City, OH (US); Ross C. Miller, Hilliard, OH (US); Jason A. Dutter, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1224 days.

(21) Appl. No.: 11/279,716

(22) Filed: Apr. 13, 2006

(51) Int. Cl.
*G06F 7/00* (2006.01)
(52) U.S. Cl. .......................... 701/36; 701/101
(58) Field of Classification Search ............... 701/1, 701/36, 29, 50, 101; 320/128–132; 307/10.1, 307/10.3, 10.6, 10.7; 318/376
See application file for complete search history.

(56) References Cited

U.S. PATENT DOCUMENTS

| | | | |
|---|---|---|---|
| 5,794,164 A | 8/1998 | Beckert et al. | |
| 5,949,484 A | 9/1999 | Nakaya et al. | |
| 6,009,363 A | 12/1999 | Beckert et al. | |
| 6,144,865 A | 11/2000 | Pichard | |
| 6,175,789 B1 | 1/2001 | Beckert et al. | |
| 6,202,008 B1 | 3/2001 | Beckert et al. | |
| 6,249,106 B1* | 6/2001 | Turner et al. | 320/136 |
| 6,275,712 B1 | 8/2001 | Gray et al. | |
| 6,289,464 B1 | 9/2001 | Wecker et al. | |
| 6,349,246 B1 | 2/2002 | Smith et al. | |
| 6,356,841 B1 | 3/2002 | Hamrick et al. | |
| 6,427,072 B1 | 7/2002 | Reichelt | |
| 6,526,335 B1 | 2/2003 | Treyz et al. | |
| 6,696,982 B2 | 2/2004 | Yoshioka et al. | |
| 6,711,474 B1 | 3/2004 | Treyz et al. | |
| 6,721,580 B1 | 4/2004 | Moon | |
| 7,431,111 B2* | 10/2008 | Nada | 180/65.28 |
| 7,570,012 B2* | 8/2009 | Dasgupta et al. | 320/104 |
| 7,632,212 B2* | 12/2009 | Yamanaka et al. | 477/107 |
| 2002/0164973 A1 | 11/2002 | Janik et al. | |

(Continued)

FOREIGN PATENT DOCUMENTS

EP 1128265 8/2001

(Continued)

OTHER PUBLICATIONS

European Search Report, dated Feb. 11, 2009, from European Patent Application No. 07007636.9.

(Continued)

*Primary Examiner*—Richard M. Camby
(74) *Attorney, Agent, or Firm*—Mark E. Duell; Plumsea Law Group, LLC

(57) ABSTRACT

A power management system for a motor vehicle is disclosed. The power management system can track one or more usage parameters to insure that electrical accessories or resources do not fully drain a battery and leave enough battery life to conduct at least one cold start. In some cases, the power management system can track one or more of the following usage parameters: the amount of time of one or more hands free telephone systems are used, the number of attempts to contact a computer, and/or the amount of time used to conduct wireless communications with a computer that is physically separate from the motor vehicle.

31 Claims, 13 Drawing Sheets

U.S. PATENT DOCUMENTS

| | | |
|---|---|---|
| 2002/0183036 A1 | 12/2002 | Marko et al. |
| 2003/0158614 A1 | 8/2003 | Friel et al. |
| 2003/0158946 A1 | 8/2003 | Arunkumar |
| 2003/0171852 A1 | 9/2003 | Vollmer et al. |
| 2004/0054444 A1 | 3/2004 | Abeska et al. |
| 2004/0139180 A1 | 7/2004 | White et al. |
| 2004/0242224 A1 | 12/2004 | Janik et al. |
| 2005/0071375 A1 | 3/2005 | Houghton et al. |
| 2005/0272482 A1 | 12/2005 | Shinoda |

FOREIGN PATENT DOCUMENTS

| | | |
|---|---|---|
| WO | WO 98/58436 | 12/1998 |

OTHER PUBLICATIONS

Office Action, dated Mar. 23, 2009, from European Patent Application No. 07 007 363.9-1242.

Partial European Search Report, dated Aug. 5, 2008, from corresponding European Patent Application No. 07 007 636.9.

* cited by examiner

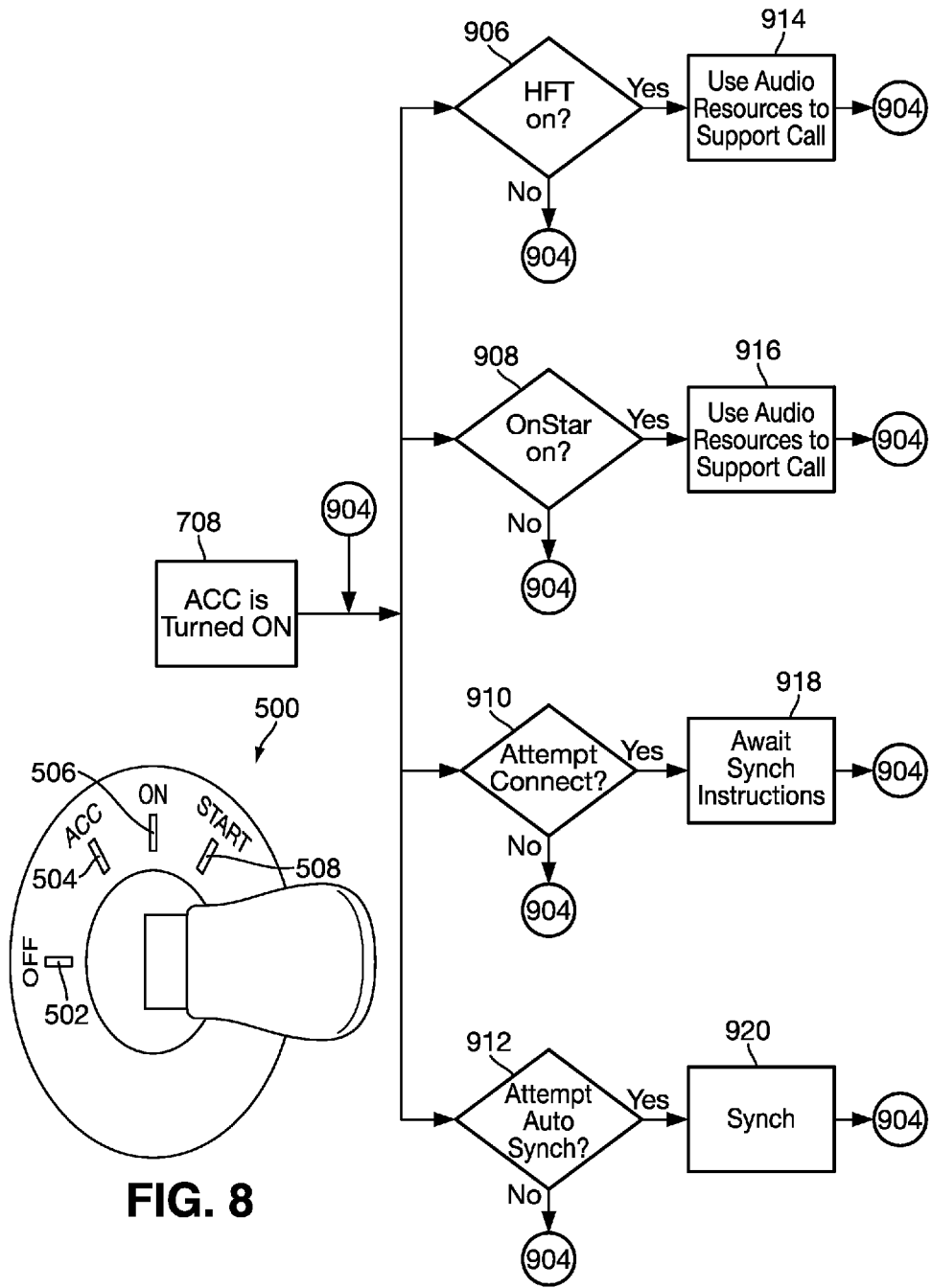

MOTOR VEHICLE POWER MANAGEMENT SYSTEM

BACKGROUND OF THE INVENTION

1. Field of the Invention

The present invention relates generally to motor vehicles, and in particular the present invention relates to a power management system suitable for use with motor vehicles.

2. Description of Related Art

The related art teaches a variety of features and functions related to communications systems and accessories associated with motor vehicles.

U.S. Pat. No. 5,949,484 to Nakaya et al. and assigned to Hitachi, Ltd., is directed to a system and method for conserving power of a portable multimedia terminal. Nakaya proposes the concept of intentionally lowering the quality of encoded information that is transmitted by the terminal in order to conserve battery power. By lowering the quality, power can be conserved because lower quality or lower compression rates help to reduce the number of CPU cycles and the number of processor instructions required.

U.S. Pat. No. 6,144,865 to Pichard and assigned to U.S. Phillips Corporation is directed to an energy saving method for vehicle-mounted electronic equipment. Pichard teaches the concept of synchronizing different wake-up periods from different applications. For example, two different applications may have similar but not identical expiration dates or time periods where a system or computer is "woken up" from a sleep mode to transmit information or conduct an operation. Pichard teaches the concept of synchronizing these wake-up times so that the system is not woken up in rapid succession.

U.S. Pat. No. 6,356,841 to Hamrick et al. and assigned to BellSouth Intellectual Property Corporation, is directed to a GPS management system. Hamrick teaches the use of a remote alert transmitter that can be used to initiate the function an In-Car unit 100. See column 7, lines 42-50. Hamrick also discloses a daily batch upload function where data that has been collected by the In-Car unit, is uploaded or sent to a central office at predetermined times. See column 12, lines 5-52.

U.S. Pat. No. 6,427,072 to Reichelt and assigned to Ericsson, Inc. is directed to a reserve power system for a communications device. The '072 patent attempts to maintain the power level of a battery above a certain preselected minimum emergency level. This emergency level allows a certain number of emergency calls to be made. The system can inhibit the non-emergency phone calls and can terminate existing non-emergency phone calls when the minimum emergency power level has been reached.

U.S. Pat. No. 6,721,580 to Moon and assigned to CISCO Technology, Inc. is directed to a communications device that permits communication as long as the power supply remains above an emergency threshold. The Moon invention proposes a system where a device maintains a certain minimal level of energy that can be used to send an emergency communication. In other words, Moon prevents the device, under ordinary use, from using energy below an established threshold.

U.S. Patent Application Publication Number 2002/0183036 to Marko et al. and apparently assigned to XM Satellite Radio, Inc. (see paragraph 0003) is directed to a battery backup system for a digital receiver unit. Marko teaches a system that considers whether the ignition of the automobile is turned on. See paragraph 0025. In Marko's system, when the vehicle is turned on or operating, the primary energy source can recharge the backup battery source. If the vehicle is not powered on (the ignition is turned off), charging the backup energy source is preferably disabled. Also, when the ignition is off, the backup battery can be used to turn the receiver on for a download of data.

U.S. Patent Application Publication Number 2004/0139180 to White et al. and assigned to Sony Corporation, teaches the concept of synchronizing media on an automobile with media on a home media server.

While the related art teaches a number of different power conservation and communications features, what is needed is a comprehensive power management system that can conserve power and also manage the power consumption of various devices and accessories that may automatically function after the motor vehicle has been switched off.

SUMMARY OF THE INVENTION

A motor vehicle that includes a power management system is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle comprising: an engine, a body, a passenger compartment configured to accommodate at least one occupant, and at least one wheel, and a communications system; where the motor vehicle receives a triggering event; where the triggering event then starts a countdown timer; and where the motor vehicle attempts to establish wireless communications with a specific computer physically separate from the motor vehicle when the triggering event is received, by determining if the motor vehicle is capable of communicating with the specific computer; and where the motor vehicle commences communications with the specific computer if it has been determined that the motor vehicle can communicate with the specific computer.

In another aspect, the motor vehicle continues to attempt to contact the specific computer until the countdown timer elapses.

In another aspect, the motor vehicle ceases attempts to contact the specific computer after the countdown timer has elapsed.

In another aspect, the triggering event is related to a door associated with the motor vehicle being locked.

In another aspect, the triggering event is programmed to occur at a predetermined time.

In another aspect, the triggering event is a manual instruction received from a user.

In another aspect, the motor vehicle synchronizes a database associated with the motor vehicle with a database associated with the specific computer if the motor vehicle has been successful in establishing contact with the specific computer.

In another aspect, the invention provides a method of managing power in a motor vehicle comprising the steps of: establishing a first predetermined usage parameter associated with a first resource; tracking the usage of the first resource when the motor vehicle is in an off condition, the off condition being a condition where an engine of the motor vehicle is turned off and where an accessory switch of the motor vehicle is turned off; and preventing usage of the first resource when the first predetermined usage parameter is exceeded.

In another aspect, the predetermined usage parameter is an amount of time a hands free telephone has been used while the motor vehicle is in the off condition.

In another aspect, the amount of time is less than 200 minutes.

In another aspect, the amount of time is less between 1 and 100 minutes.

In another aspect, the amount of time is about 52 minutes.

In another aspect, the predetermined usage parameter is a predetermined number of attempts to connect with a specific computer that is physically separate from the motor vehicle when the motor vehicle is in the off condition.

In another aspect, the predetermined number of attempts is less than 30 attempts per day.

In another aspect, the predetermined number of attempts is between 2 and 15 attempts per day.

In another aspect, the predetermined number of attempts is about 7 attempts per day.

In another aspect, the predetermined number of attempts is less than 10 attempts per week.

In another aspect, the predetermined number of attempts is less than 5 attempts per week.

In another aspect, the predetermined number of attempts is about 2 attempts per week.

In another aspect, the predetermined usage parameter is related to an amount of current draw from a battery by the first resource.

In another aspect, the predetermined usage limit is related to an estimated power reserve to conduct a cold start.

In another aspect, the invention provides a method of managing power in a motor vehicle comprising the steps of: establishing a first predetermined usage parameter associated with a first resource; tracking the usage of the first resource when the motor vehicle is in an off condition, the off condition being a condition where an engine of the motor vehicle is turned off and where an accessory switch of the motor vehicle is turned off; and resetting the predetermined usage parameter when the motor vehicle is transitioned from the off condition to an on condition.

In another aspect, the predetermined usage parameter is an amount of time a hands free telephone has been used while the motor vehicle is in the off condition.

In another aspect, the predetermined usage parameter is a predetermined number of attempts to connect with a specific computer that is physically separate from the motor vehicle when the motor vehicle is in the off condition.

In another aspect, the predetermined usage parameter is a duration of time a synchronize process has operated when the motor vehicle is in the off condition.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is a schematic diagram of a preferred embodiment of an ignition switch in an "on" position;

FIG. 9 is a flow diagram of a preferred embodiment of a process associated with an "on" state;

DETAILED DESCRIPTION OF THE PREFERRED EMBODIMENTS

Figure 1:
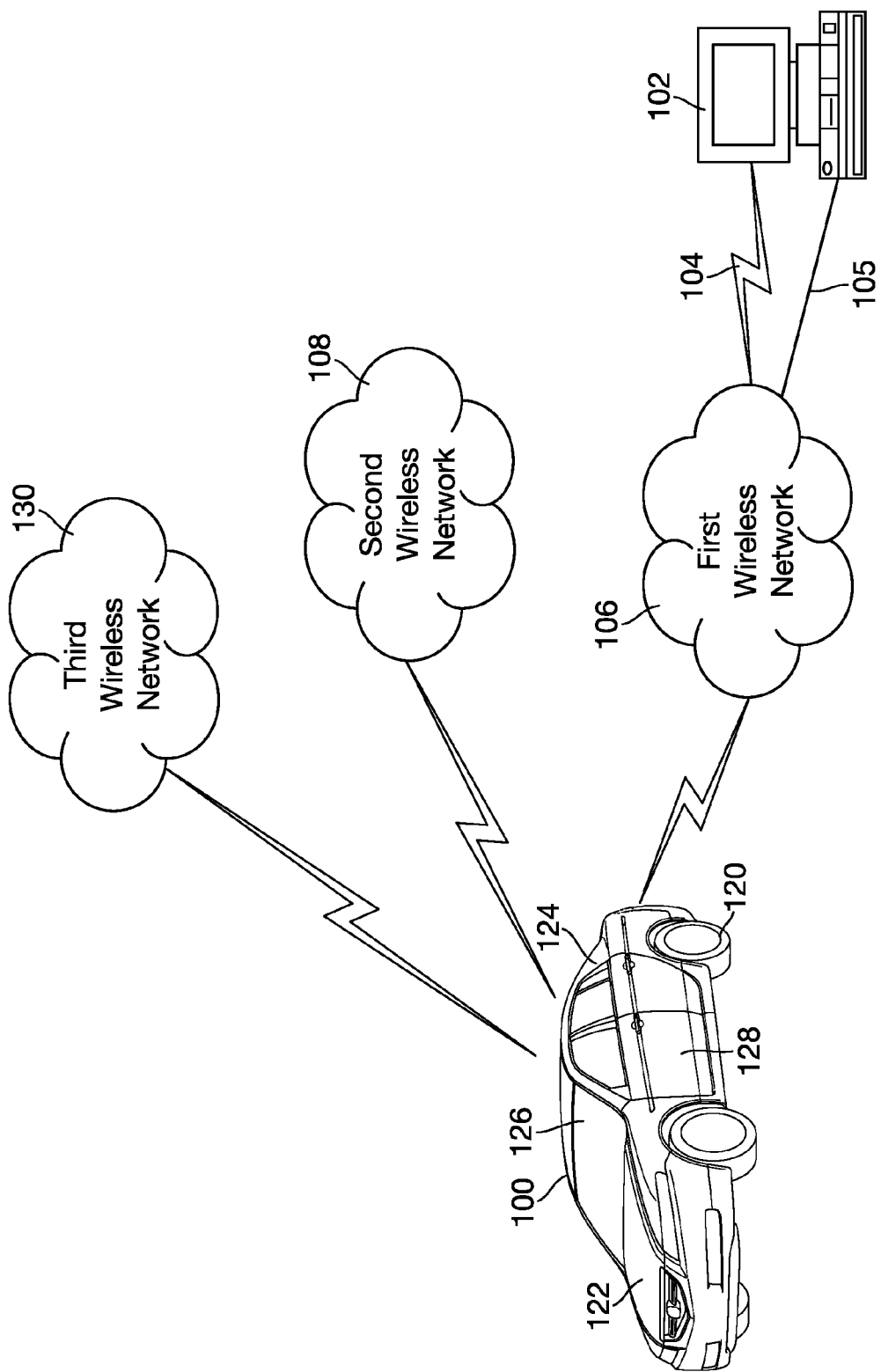
FIG. 1 is a schematic diagram of a preferred embodiment of a motor vehicle with various communications networks and computers.

FIG. 1 is a schematic diagram of an illustrative embodiment of motor vehicle 100 along with various communications and computer resources. As shown in FIG. 1, first wireless communications network 106 can communicate wirelessly with motor vehicle 100 and computer 102. First wireless network 106 can be any kind of wireless network, including but not limited to any broadband wireless access network or a high bandwidth packet switched network. In some embodiments, first wireless network 106 may use, for example, any one, several or all of the following standards: IEEE 802.xxx including but not limited to: IEEE 802.11a, IEEE 802.11b, and/or IEEE 802.11g, commonly referred to as WiFi, IEEE 802.11n and/or IEEE 802.16a, sometimes referred to as WiMAX. In the preferred embodiment shown in FIG. 1, first wireless network 106 is a broadband access network that facilitates wireless communications between motor vehicle 100 and computer 102.

Computer 102 can communicate with first wireless network 106 wirelessly 104 or directly 105. In those embodiments where computer 102 communicates with first wireless network 106 wirelessly, computer 102 preferably includes provisions to facilitate wireless communications with first wireless network 106. Some examples of these kinds of provisions include wireless network adapters. In embodiments where computer 102 is directly connected to first wireless network 106, computer 102 is generally directly connected to one or more elements of wireless network 106, for example a switch fabric, a router or a wireless router.

In some embodiments, computer 102 can use more than one method of communicating with wireless network 106 with a primary connection mode and use other methods as back-ups. In some embodiments, computer 102 can communicate directly with motor vehicle 100 without the participation of first wireless network 106. In these instances, computer 102 can communicate directly with motor vehicle 100 using an ad hoc mode. Computer 102 can be a portable computer, for example, a laptop, notebook or Personal Data Assistant (PDA) that can be brought close to motor vehicle 100. In some cases, computer 102 can be brought inside motor vehicle 100.

Computer 102 can include a database, generally residing in a mass storage device like a hard disk drive or an optical storage device. The term "computer" refers to the computing resources of a single computer, a portion of the computing resources of a single computer, and/or two or more computers in communication with one another, also any of these resources can be operated by one or more human users. In an exemplary embodiment, computer 102 includes a personal computer.

Second wireless network 108 is preferably different than first wireless network 106 and can be any kind of wireless network, including but not limited to any cellular telephone network using, for example, any one of the following standards: CDMA, TDMA, GSM, AMPS, PCS, analog, and/or W-CDMA. In the embodiment shown in FIG. 1, second wireless network 108 facilitates wireless communications between motor vehicle 100 and other parties who can access second wireless network 108.

Preferably, motor vehicle 100 includes provisions to conduct communications with a third wireless network. In the embodiment shown in FIG. 1, motor vehicle 100 is configured to conduct communications with third wireless network 130. Third wireless network 130 is preferably different than first wireless network 106 and second wireless network 108. Third wireless network 130 can be any kind of wireless network, including but not limited to any cellular telephone network using, for example, any one of the following standards: CDMA, TDMA, GSM, AMPS, PCS, analog, and/or W-CDMA. In some embodiments, third wireless network 130 can include an analog cellular network. These kinds networks that include analog components can be either entirely analog or include a mix of digital and analog components. Third wireless network 130 can also be a data network.

In the embodiment shown in FIG. 1, third wireless network 130 facilitates wireless communications between motor vehicle 100 and other parties who can access third wireless network 130. In a preferred embodiment, third wireless network 130 is a vehicle assistance network. An example of a vehicle assistance network, which can be used in some embodiments, is the ™ network. In a preferred embodiment, the AcuraLink™ Assist network serves as vehicle assistance network 130. However, it should be kept in mind that any other vehicle assistance network could also be used.

Figure 2:
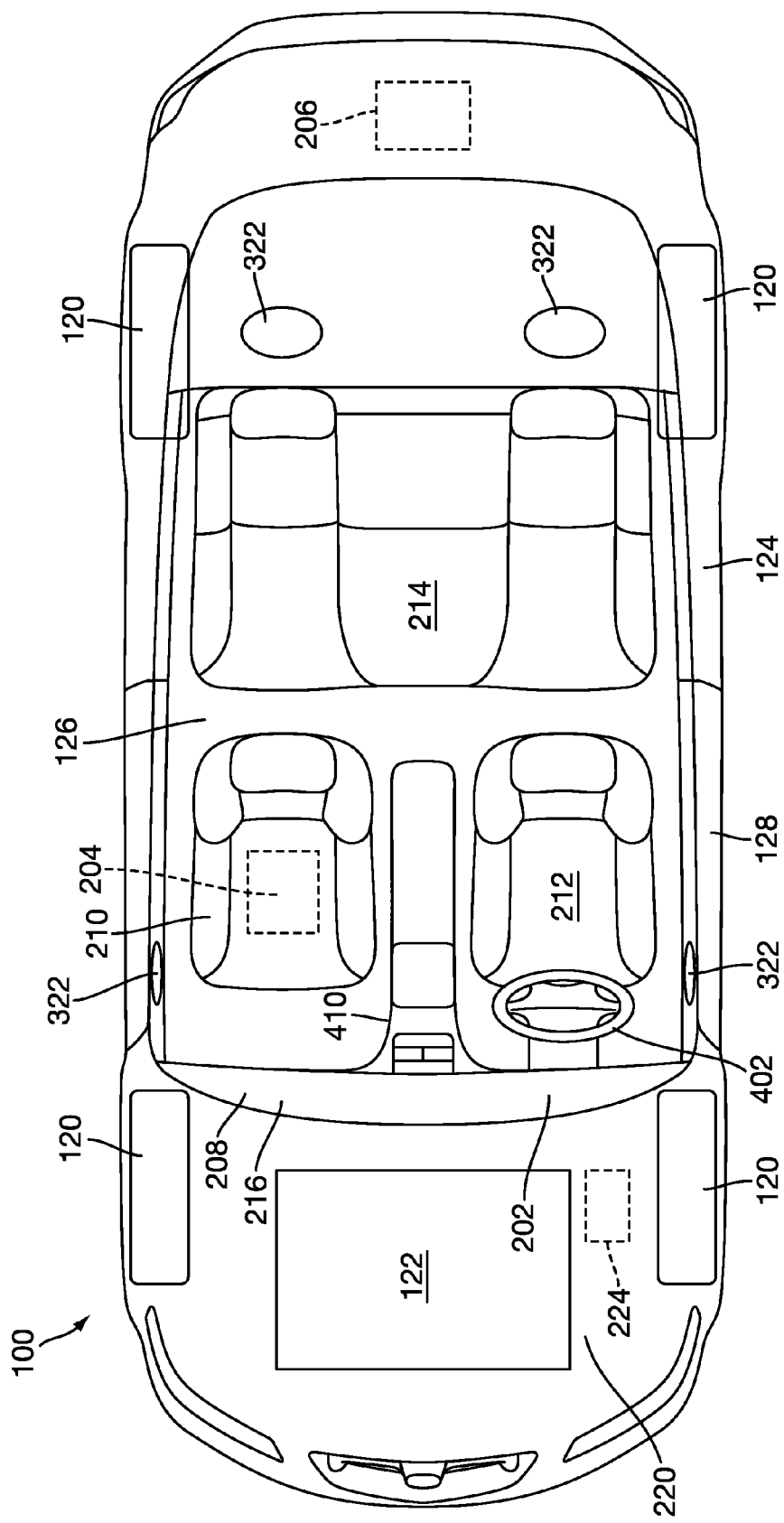
FIG. 2 is a top schematic view of a preferred embodiment of a motor vehicle.

Focusing on motor vehicle 100, FIG. 2 is a schematic diagram of a top view of a preferred embodiment of motor vehicle 100. From this view, the relative locations of various components and resources associated with motor vehicle 100 can be observed. FIGS. 1 and 2 merely illustrate one embodiment; it should be kept in mind that the various components and resources can be disposed in any convenient location within, on or around motor vehicle 100. Referring to FIGS. 1 and 2, motor vehicle 100 includes at least one wheel 120 adapted to contact a road surface, an engine 122, a body or chassis 124 and a door 128 that provides access to a passenger compartment 126, which is adapted to accommodate at least one human passenger. In some embodiments, motor vehicle 100 does not include door 128. For example, if motor vehicle 100 were a motorcycle, scooter or personal watercraft, motor vehicle 100 would generally not include door 128.

Figure 4:
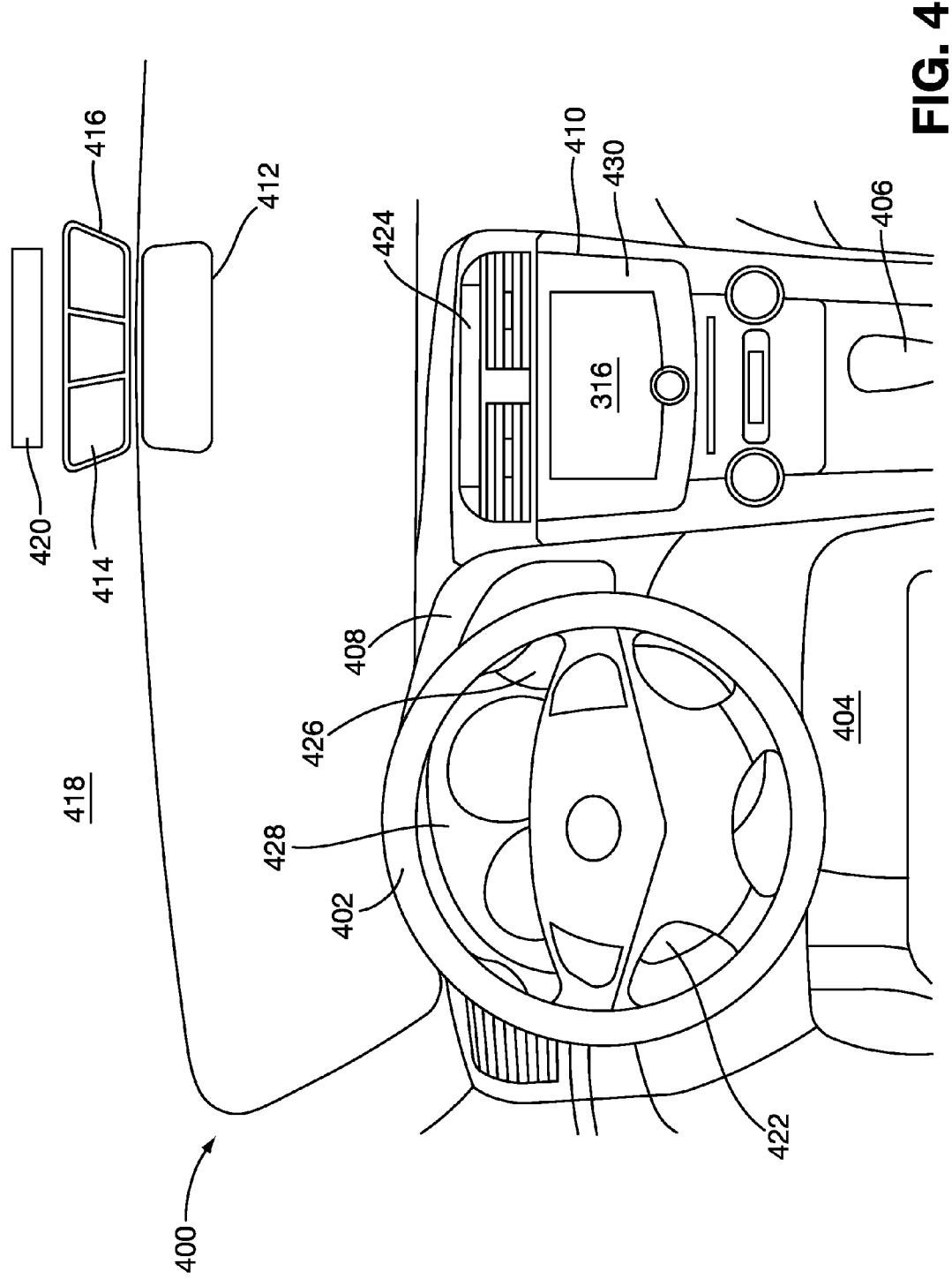
FIG. 4 is a schematic diagram of a preferred embodiment of a passenger compartment of a motor vehicle.

As shown in FIGS. 1 and 2, motor vehicle 100 can include components or resources disposed in or about passenger compartment 126. In the embodiment shown in FIGS. 1 and 2, motor vehicle 100 includes steering wheel 402, center console 410 and at least one loudspeaker 322. In some embodiments, more than one loudspeaker is provided, and in the embodiment shown in FIG. 2, four loudspeakers 322 are provided. Additional components and resources that may be associated with passenger compartment 126 are shown in FIG. 4.

Figure 3:
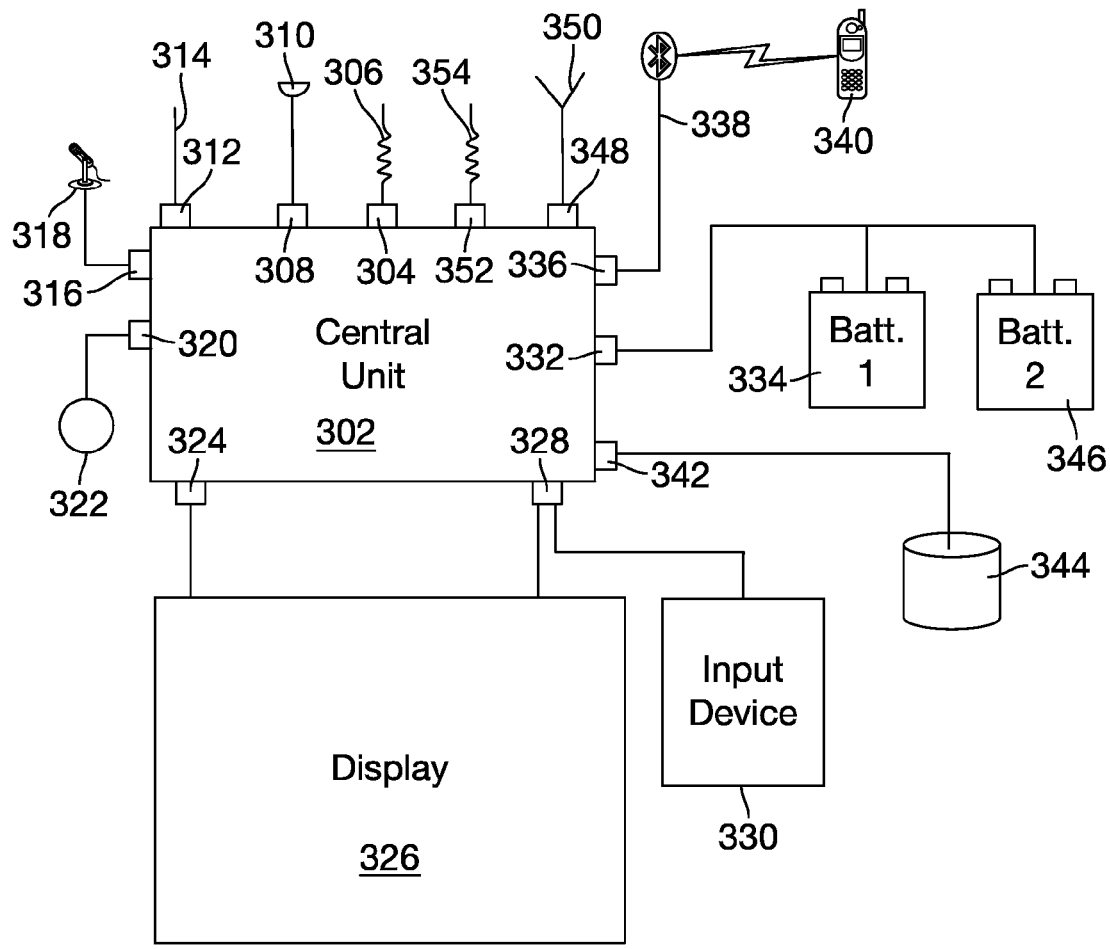
FIG. 3 is a schematic diagram of a preferred embodiment of devices, resources and/or provisions that are associated with motor vehicle 100.

FIG. 3 is a schematic diagram of several devices, resources and/or provisions that are associated with motor vehicle 100. Central unit 302 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with central unit 302 are optional. Some embodiments may include a given port or provision, while others may exclude it. The following description discloses many of the possible parts and provisions that can be used, however, it should be kept in mind that not every part or provision must be used or included in a given embodiment.

Central unit 302 includes a wireless network antenna port 304 that is designed to receive information from a wireless network antenna 306, a GPS antenna port 308 designed to receive information from a GPS antenna 310, a radio antenna port 312 designed to receive information from a radio antenna 314.

Central unit 302 can also include a number of items that facilitate human interaction. To receive vocal information from a user, central unit 302 can include a microphone port 316 that is capable of communicating with a microphone 318. Central unit 302 can also include an audio port 320 that is designed to send audio information to one or more speakers 322 or audio devices. These audio devices can include preamplifiers, amplifiers and/or crossovers. In some embodiments, microphone port 312 and audio port 316 are conductors associated with a single physical connector. For example, microphone port 312 and audio port 316 can be female conductors of a multi-channel coaxial plug, like a standard 2.5 mm headset plug.

In order to provide visual information to a user, central unit 302 can include a display port 324 that is capable of interacting with a display device 326. To receive input from a user, central unit 302 can include an input port 328. Input port 328 can communicate with input device 330. In some embodiments, display device 326 can also receive input from a user. In some embodiments, display device 326 includes a touch screen that can receive input and in other embodiments, display device 326 includes a number of buttons that can receive input. In some embodiments, display device 326 includes both a touch screen and buttons. As shown in FIG. 3, user input received by display device 326 can also communicate with input port 328.

A power port 332 can connect central unit 302 to a power supply 334. In the embodiment shown in FIG. 3, first power supply 334 can be a typical car battery. Optionally, a second battery 346 can be provided. This second battery 346 can be a rechargeable battery associated with central unit 302 and can be used to provide power to central unit 302 and other components when motor vehicle 100 is not running. In a preferred embodiment, second battery 346 is similar to a laptop computer battery. Preferably, second battery 346 is recharged when motor vehicle 100 is running.

Referring to FIGS. 1 and 3, central unit 302 can include provisions that help to facilitate communications with first wireless network 106. As shown in FIG. 3, central unit 302 can include a first wireless network antenna port 348 that is connected to first wireless network antenna 350. Using these resources, central unit 302 can communicate with first wireless network 106. In a preferred embodiment, first wireless network 106 is a broadband wireless access network and central unit 302 preferably includes provisions to interact with such networks. In the case of a broadband wireless access network, central unit 302 can include hardware and software analogous to a network adapter so that central unit 302 will be recognized by first wireless network 106 and will be able to communicate with first wireless network 106.

In some embodiments, those provisions that facilitate communications with first wireless network 106 can be turned on or off and those provisions can have an operational state that is independent of motor vehicle 100. For example, the network provisions can be turned off when motor vehicle 100 is running and those provisions can be turned on even when motor vehicle 100 is not running.

Central unit 302 can also include provisions to communicate with a wireless telephone. Any system can be used to facilitate this communication with a wireless telephone; however, a low power radio frequency system is preferred. In an exemplary embodiment, a wireless local or personal area network using the Bluetooth protocol is used to facilitate communication with a wireless telephone. In the exemplary embodiment shown in FIG. 3, central unit 302 includes a local wireless network antenna port 336 that is designed to communicate with a local wireless network antenna 338, which in turn, is designed to communicate wirelessly with wireless telephone 340.

Referring to FIGS. 1 and 3, there are two ways in which central unit 302 can communicate with second wireless network 108. In some embodiments, central unit 302 includes provisions that permit central unit 302 to act as a wireless telephone. In these embodiments, central unit 302 communicates directly with second wireless network 108 and can use wireless network antenna port 304 and wireless network antenna 306 to assist with this communication. In other embodiments, central unit 302 communicates with wireless telephone 340, which in turn, communicates with second wireless network 108. In these other embodiments, central unit 302 can use local wireless antenna port 336 and associated local wireless network antenna 338 to assist in facilitating communications with wireless telephone 340. One or both of these methods can be used by central unit 302 to communicate with second wireless network 108.

Central unit 302 can also include provisions that allow motor vehicle 100 to communicate with third wireless network 130. In a preferred embodiment, central unit 302 includes a third wireless network antenna port 352 that is designed to communicate with a third wireless network antenna 354, which in turn, is designed to communicate wirelessly with third wireless network 130.

Central unit 302 can also include memory, data storage provisions including one or more databases. Preferably central unit 302 is in communication with at least one storage device 344. Storage device 344 can be any kind of storage device, including but not limited magnetic, optical, magneto-optical, and/or memory, including volatile memory and non-volatile memory. In some embodiments, storage device 344 is integral with central unit 302 and in other embodiments, storage device 344 is separate from central unit 302 and communicates with central unit 302. In some embodiments, storage device 344 is also used to store navigation information.

Central unit 302 can include provisions to decode and playback music in a variety of different formats and using different protocols. For example, central unit 302 can receive digital information from a conventional compact disk, decode this information and prepare an analog signal suitable for output to audio port 320 or to a preamplifier. In some embodiments, central unit 302 can also include decoders that are capable of decoding compressed music files including formats like MP3, AAC, WAV, WMA, ALTRAC, OGG or any other desired file format. Central unit 302 can also include decoders that are capable of decoding uncompressed audio files. Central unit 320 can also include decoders that are capable of decoding high quality audio, for example, DVD-Audio or Super Audio CD (SACD).

In some embodiments, all or most of the items shown in FIG. 3 are housed in a single case or unit. In other embodiments, the various items shown in FIG. 3 are not housed at a single physical location, but instead, are distributed throughout motor vehicle 100 and communicate with one another via known wired or wireless methods. These various locations are shown in FIG. 2.

FIG. 4 is a schematic diagram of a preferred embodiment of interior 400 of motor vehicle 100. Resources and provisions associated with motor vehicle 100 can be placed in various locations. In some cases, it is desirable that the resources are placed in locations that are generally not immediately visible to occupants in passenger compartment 126. In other situations, it can be desirable to place certain resources and provisions in locations where they are visible to occupants in passenger compartment 126.

Referring to FIGS. 2 and 4, resources can be placed in a dashboard location 202. This location is generally similar to the placement of a typical head unit. Dashboard location 202 can be near or in dashboard 408 or center console 410. Resources can be placed in a first location 204 under seat 210. These resources or other resources can also be placed under driver's seat 212 or rear seat 214. Trunk location 206 can also be used to accommodate resources. A glove box location 208 near or in glove box 216 can be used to store various resources. Another possible location 224 is within engine bay 220. These are some of the possible locations where resources can be placed. The locations are shown in dotted lines to indicate that the locations can be inside or underneath the items shown in FIG. 2.

In some embodiments, all of the various resources are located in a single location, while in other embodiments different resources are located in different locations. One or more of the locations can be used. If more than one location is used, the resources can use either a direct communications link or a wireless communications link to communicate with one another. In an exemplary embodiment, Control Area Network (CAN) is used when the various resources are directly connected to one another. Preferably, the Bluetooth protocol is used if the various resources communicate wirelessly. In some embodiments, both direct and wireless communications methods can be used.

FIG. 4 is a preferred embodiment of an interior 400 of passenger compartment 126 of motor vehicle 100 (see FIG. 1). Interior 400 includes steering wheel 402, driver's seat 404, shifter or gear selector 406, dashboard 408 and center console 410. Center console 410 includes an upper portion 412 and a lower portion 414. In some embodiments, lower portion 414 includes radio and/or audio controls. Preferably, upper portion 412 includes display 416. In some embodiments, upper portion 412 includes a multi-function unit that can communicate with or control an audio system, a climate control system and/or a navigation system.

In an exemplary embodiment, display 416 is used as display device 326, shown schematically in FIG. 3. Also in the exemplary embodiment, central unit 302 or portions of central unit 302 is disposed behind display 416. In some embodiments, display 416 can include a touch screen and in some embodiments, buttons can be disposed next to display 416.

In some embodiments, interior 400 can include a Hands Free Telephone (HFT) unit 420 mounted in headliner 418. HFT unit 420 is an embodiment of COM1 304 (see FIG. 3). HFT unit 420 includes microphone 414, which is an embodiment of microphone 308 (see FIG. 3). Microphone 414 may also be used with VCS 330.

HFT unit 420 is mounted above headliner 418 so that it is out of plain sight. HFT controls 422 may also be mounted onto steering wheel 402. An HFT display unit 424 may be disposed in the center console. In addition, some embodiments include a multi-function display 426 disposed on dashboard 408. Multi-function display 426 can also show HFT information and status. In some embodiments, multi-function display 426 is disposed within instrument cluster 428 on dashboard 408. The arrangement of the various components of the HFT system in the embodiment shown in FIG. 4 is intended to be ergonomically correct, and provide the user with an intuitive and easy to use HFT.

While the devices associated with Vehicle Assistance Network (VAN) can be placed in any desired location, the embodiment shown in FIG. 4 shows a particular location of the various devices. VAN controls and VAN microphone 416 are placed in headliner 418 near rear view mirror 412. Other equipment including a VAN system unit and a VAN antenna can also be associated with motor vehicle 100 (see FIG. 1). Preferably, the VAN system unit is placed out of plain view, for example, under the passenger seat or under the rear seats or in the trunk. Preferably, the VAN antenna is disposed on an exposed exterior surface of motor vehicle 100.

In one embodiment, central unit 302 includes provisions that allow central unit 302 to act as a hands free telephone system. In this regard, microphone 318 can be placed in a discreet and somewhat hidden location in passenger compartment 126 (see FIG. 1) of motor vehicle 100 (see FIG. 1). Other components are preferably placed out of plain sight.

Some embodiments include many of the features and provisions disclosed above. If many of those features are provided, heavy demands may be placed on the power system of the motor vehicle. Preferably, a power management system is provided to manage the power consumed by the various electrical devices and prevent excessive power drain on the motor vehicle's power system.

Figure 5:
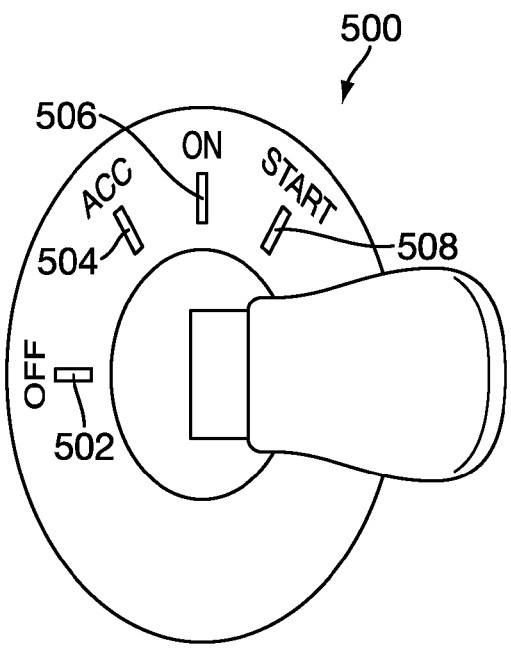
FIG. 5 is a schematic diagram of a preferred embodiment of an ignition switch.

FIG. 5 is a schematic diagram of an embodiment of an ignition switch 500. Although many different kinds of ignition switches can be used, an ignition switch having the features shown schematically in FIG. 5 is preferred. Referring to FIGS. 2 and 5, ignition switch 500 preferably includes multiple positions. First position 502 can be an "off" position. In this first position, engine 122 is preferably turned off and is not running. In addition, electrical power is generally not provided to one or more electrical components or resources. In some embodiments, one or more electrical components are provided with electrical power when ignition switch 500 is in the first position 502. Some examples of components or resources that can still receive electrical power when ignition switch 502 is in the first "off" position include audio systems, devices that support the operation of HFT's and cigarette lighters.

Preferably, ignition switch 500 includes a second position 504. In this second position 504, engine 122 is not running, but electrical power is provided to most of the electrical components or resources. In some embodiments, this second position 504 is referred to as "accessory" or by its abbreviation, "ACC."

Preferably, ignition switch 500 includes a third position 506. In this third position 506, motor vehicle 100 is in an "on" state where engine 122 is running. In this third position 506, electrical power is generally provided to all of the electrical components or resources associated with motor vehicle 100.

Preferably, ignition switch 500 includes a fourth position 508. This fourth position 508 is used to cold start motor vehicle 100. In this fourth position 508, a starter motor (not shown) associated with motor vehicle 100 is instructed to crank and start engine 122. Preferably, fourth position 508 is spring biased in a counter-clockwise direction so that when ignition switch 500 is released from the fourth position 508, ignition switch 500 moves to the third "on" position 506.

Figure 6:
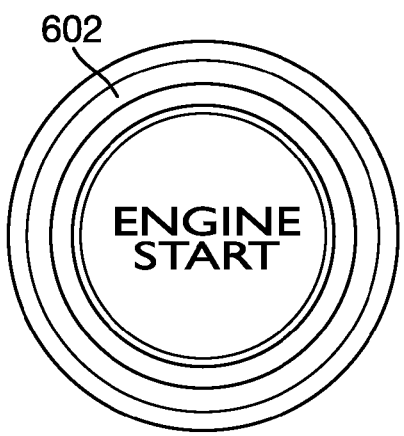
FIG. 6 is an enlarged schematic diagram of a preferred embodiment of a start button.

FIG. 6 is a schematic diagram of an embodiment of an optional start button 602. Some embodiments include a start button 602 while others do not. In some embodiments, start button 602 is provided in conjunction with ignition switch 500. In other words, some embodiments include both start button 602 and ignition switch 500.

Start button 602 can be used to start motor vehicle 100. Start button 602 sends an instruction to start motor (not shown) to crank and start engine 122. In some embodiments, start button 602 must be held down. In other embodiments, an ignition key must first be turned with one hand and start button 602 pushed down with the other hand.

In some embodiments, some of the electronic features are permitted to operate after the ignition switch has been turned off. Preferably, a power management system is provided to control and manage the amount of power consumed by the various electronic accessories and prevent excessive power consumption. In a preferred embodiment, the power system prevents many of the various electronic accessories from draining the motor vehicle's battery beyond a point where the battery may be incapable of providing enough power for a cold start.

Figure 7:
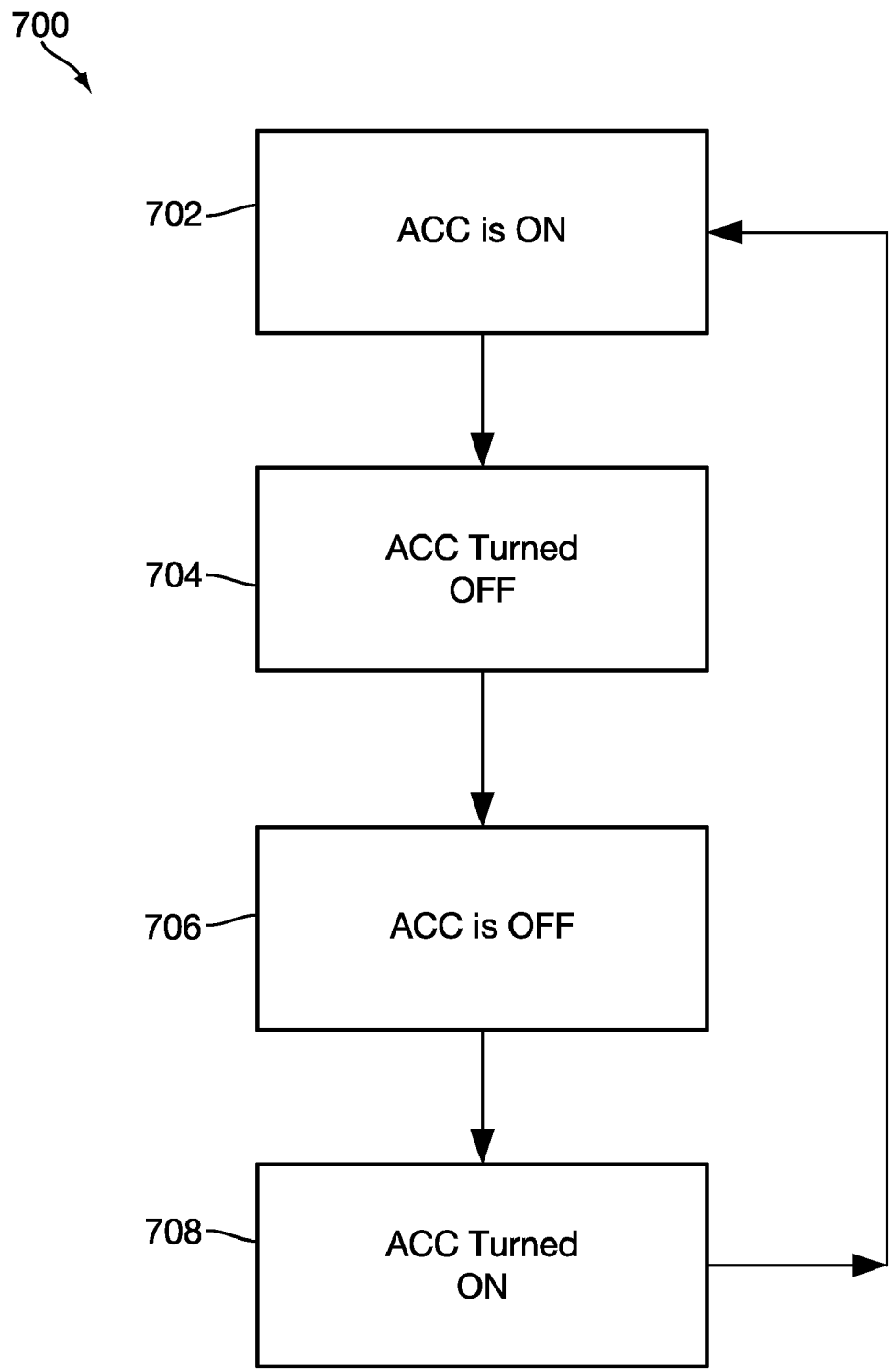
FIG. 7 is a flow diagram of a preferred embodiment of various operational states.

FIG. 7 is a flow diagram of a preferred embodiment of various operational states of motor vehicle 100 (see FIG. 1). In the embodiment shown in FIG. 7, motor vehicle 100 has two operational states and two transitional states. As shown in FIG. 7, motor vehicle 100 can have an on state as shown in step 702 and an off state as shown in step 706. The "on" state shown in step 702 can be a state where the engine or other power plant of motor vehicle 100 is running and providing electrical power to accessories associated with motor vehicle 100. The "off" state shown in step 706 can be a condition where motor vehicle 100 is not actively generating electrical power but is operating various electronic accessories by using reserve battery power.

Motor vehicle 100 can also include two transitional states as well. Transitional state 704 is a transition from the motor vehicle being "on" in step 702 to the motor vehicle being "off" in step 706. The transitional state as shown as step 704 and the operational state of being turned off is shown in step 706. Motor vehicle 100 can also include another transitional step 708, where motor vehicle 100 is changed from an "off" state, step 706, to the "on" state step 702. The transition from "off" to "on" is shown as step 708. There are many ways to make the transition from "off" to "on," however, in a preferred embodiment, an ignition switch 500 is used to start the engine 122 of motor vehicle 100.

FIG. 8 is a schematic diagram of a preferred embodiment of an ignition switch 500. In FIG. 8, ignition switch 500 is shown in an on position 506. In this position, engine 122 of motor vehicle 100 is preferably running and actively generating electricity for the electrical accessories associated with motor vehicle 100.

FIG. 9 is preferred embodiment of a flow diagram of motor vehicle 100 in an "on" state. Referring to FIGS. 7 and 9, in step 708 the motor vehicle 100 is transitioned from an "off" state 706 to an "on" state 702 by a transition state 708 where the engine 122 of motor vehicle 100 is turned on. After motor vehicle 100 has been turned on, various resources and accessories associated with motor vehicle 100 are available for use. All of the resources and features shown in FIG. 9 are optional and can be included or excluded from various different embodiments.

In some embodiments motor vehicle 100 includes provisions to support the use of a hands-free telephone. If this feature is provided, motor vehicle 100 can include step 906 where motor vehicle senses or determines whether a hands-free telephone has been activated. In step 906, if a hands-free telephone associated with motor vehicle 100 has been activated, motor vehicle 100 can provide resources to support hands-free telephone calls in step 914.

In some embodiments, motor vehicle 100 supports hands-free telephone calls by providing audio resources to receive voice information from the user and to provide audio output to the user. These resources can help to facilitate hands-free telephone calls. These audio resources can include a microphone shown schematically as 318 in FIG. 3 and shown schematically as microphone 414 in FIG. 4, and an amplifier and speaker 322 (see FIG. 3). Other embodiments can use different resources to support hands-free telephone calls, with some embodiments using a personal wireless network, for example, Bluetooth™ to support hands-free telephone calls.

While the hands-free telephone call is in progress, and while motor vehicle 100 assists in facilitating the hands-free telephone call in step 914, the process can return to step 904 where additional processes or features can operate simultaneously with the hands-free telephone call.

Some embodiments include provisions to facilitate communications between motor vehicle 100 and third wireless network 130. If these provisions are provided, motor vehicle 100 can include step 908 where motor vehicle 100 determines if communications between motor vehicle 100 and third wireless network 130 have been requested or are occurring. In an exemplary embodiment, third wireless network 130 is a wireless network that is provided by a different service provider than the service provider of second wireless network 108. In an exemplary embodiment, third wireless network 130 is a communications and vehicle assistance network (VAN). One example of third wireless network 130 is the AcuraLink™ Assist network.

In step 914, motor vehicle 100 can provide resources to support communications with third wireless network 130. In some embodiments, motor vehicle 100 uses similar audio resources to support VAN calls as conventional hands-free telephone calls. However, in other embodiments, VAN calls are supported by their own audio resources. In those embodiments where different resources are used to support VAN calls as conventional hands-free telephone calls, different microphones, speakers and amplifiers can be provided.

In some embodiments, communications with third wireless network 130 take priority over communications with second wireless network 108. In these embodiments, if a call is made or received by motor vehicle 100, resources supporting calls made to or from second wireless network 108 are either suspended or terminated and those resources are devoted to supporting calls in step 916. In other embodiments both calls can exist concurrently. The following commonly owned patent application disclose systems and methods that can be used to manage multiple hands-free telephone calls: U.S. patent application publication number US-2005-0075128-A1 to Diedrich et al., the entirety of this application is hereby incorporated by reference. In some embodiments, the systems and methods disclosed in the '128 Diedrich application can be used with embodiments of the present invention. While motor vehicle 100 is devoting resources to support the VAN call in 916, the process can return to step 904 where additional features or accessories can simultaneously operate.

Some embodiments include provisions that allow motor vehicle 100 to communicate with first wireless network 106. As disclosed above, first wireless network 106 can be a packet switched network that is configured to communicate with a home computer or personal computer 102. In those embodiments where motor vehicle 100 includes provisions to communicate with first wireless network 106, motor vehicle 100 can include a step 910 where motor vehicle 100 attempts to connect with personal computer 102 via first wireless network 106.

Figure 10:
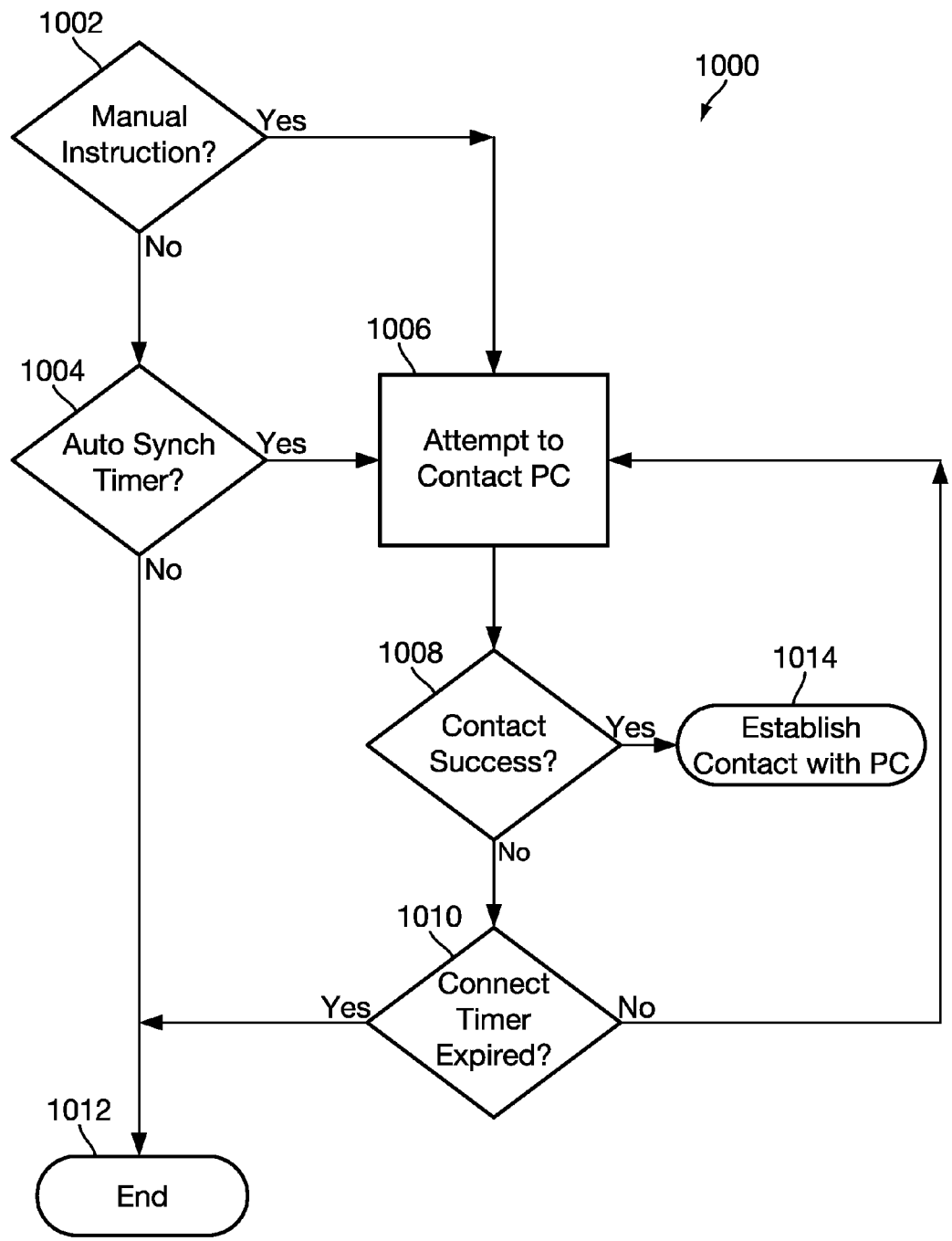
FIG. 10 is a flow diagram of a preferred embodiment of a process for attempting to contact a computer.

Although many different algorithms or processes can be used to facilitate or determine the availability of communications between motor vehicle 100 and computer 102, the following process shown in FIG. 10 is preferred. FIG. 10 is a flow diagram of a preferred embodiment of a method for determining the availability of communications between motor vehicle 100 and computer 102. Process 910 preferably starts with step 1002 where the process determines if a manual instruction to connect with computer 102 has been received.

This manual instruction can take on many different forms. In some embodiments, different acts or events can all be interpreted by motor vehicle 100 as a manual instruction. In some embodiments, the act of locking one or more doors 128 of motor vehicle 100 can be interpreted by motor vehicle 100 as a manual instruction to attempt to connect to computer 102. In some embodiments, the event where motor vehicle 100 loses communications or loses wireless contact with computer 102 can be interpreted as a manual instruction to attempt to contact, connect or communicate with computer 102.

In some embodiments, a manual request to attempt to contact computer 102 can be interpreted by motor vehicle 100 as a manual instruction to attempt to contact computer 102. This manual request can take the form of receiving information from a button or switch designated to initiate contact computer 102. This button or switch can also be designated as a synchronize instruction as disclosed below. Any of these acts or instructions can be interpreted by motor vehicle 100 as a manual instruction to attempt to contact computer 102.

In some embodiments, multiple different acts or events can serve as a manual instruction to contact computer 102. For example, the act of locking a door, the event where a connection between motor vehicle 100 and computer 102 is lost and/or the receipt of a manual request can all act as a manual instruction to contact computer 102. In step 1002, if a manual instruction is received, the process moves to step 1006 where an attempt to contact computer 102 is made. However, if no manual instruction is received in step 1002, the process moves to step 1004 where motor vehicle 100 determines if an automated process has requested contact or communications with computer 102.

In the embodiment shown in FIG. 10, step 1004 is associated with an automatic synchronized timer. This automatic synchronized timer can be used to transfer information between motor vehicle 100 and computer 102 at regular and/or predetermined intervals. In one example, motor vehicle 100 includes a database that is regularly updated with information from computer 102. This database associated with motor vehicle 100 can include navigation information and/or entertainment information. In some embodiments, entertainment information includes one or more music or audio files.

In step 1004, if an automatic synchronize process has been established, process 910 determines if the audio synchronize timer requests connection or contact with computer 102. If such an automatic synchronize request has been received, process 910 moves to step 1006 where an initial attempt is made to contact computer 102. However, if the automatic synchronize process has not been established or an established automatic synchronize process has not requested contact or communications with computer 102, then the process moves to step 1012 where the process is ended and contact with computer 102 has not been established.

Returning to step 1006, motor vehicle 100 attempts an initial contact with computer 102. If contact is successful in step 1008, then the process moves to step 1014 where motor vehicle 100 either initiates communication with computer 102 or waits for computer 102 to initiate communication. If contact is unsuccessful in step 1008, then the process moves to step 1010 where a process 910 determines if a connect timer has expired. Step 1010 is a preferred but optional step. In other words, in some embodiments after a first attempt to contact computer 102 is made and fails, process 910 can move directly to step 1012 where contact with computer 102 has not been established.

In those embodiments that include a connect timer, the connect timer can establish a period of time where repeated attempts to contact computer 102 is made. In some embodiments, the connect timer can be any time from zero to 10 minutes; however, in an exemplary embodiment, the connect timer is set to about one minute. During this one minute period of time, motor vehicle 100 attempts to contact computer 102, and if unsuccessful, continues to attempt contact with computer for about one minute. After the one minute period, the connect timer expires in step 1010 and motor vehicle 100 no longer attempts contact with computer 102. From there, the process moves to step 1012 where contact with computer 102 has not been established. In some cases, motor vehicle 100 can provide an indication that connection or communications with computer 102 has failed.

Returning to FIG. 9, another optional process that can be associated with motor vehicle 100 is an automatic synchronize process. In embodiments that include an automatic synchronize process, motor vehicle 100 preferably includes step 912 where motor vehicle 100 determines if a request or command to automatically synchronize has been received or established. If a request or command to automatically synchronize has been received, the process moves to step 920 where motor vehicle 100 synchronizes with computer 102.

Figure 11:
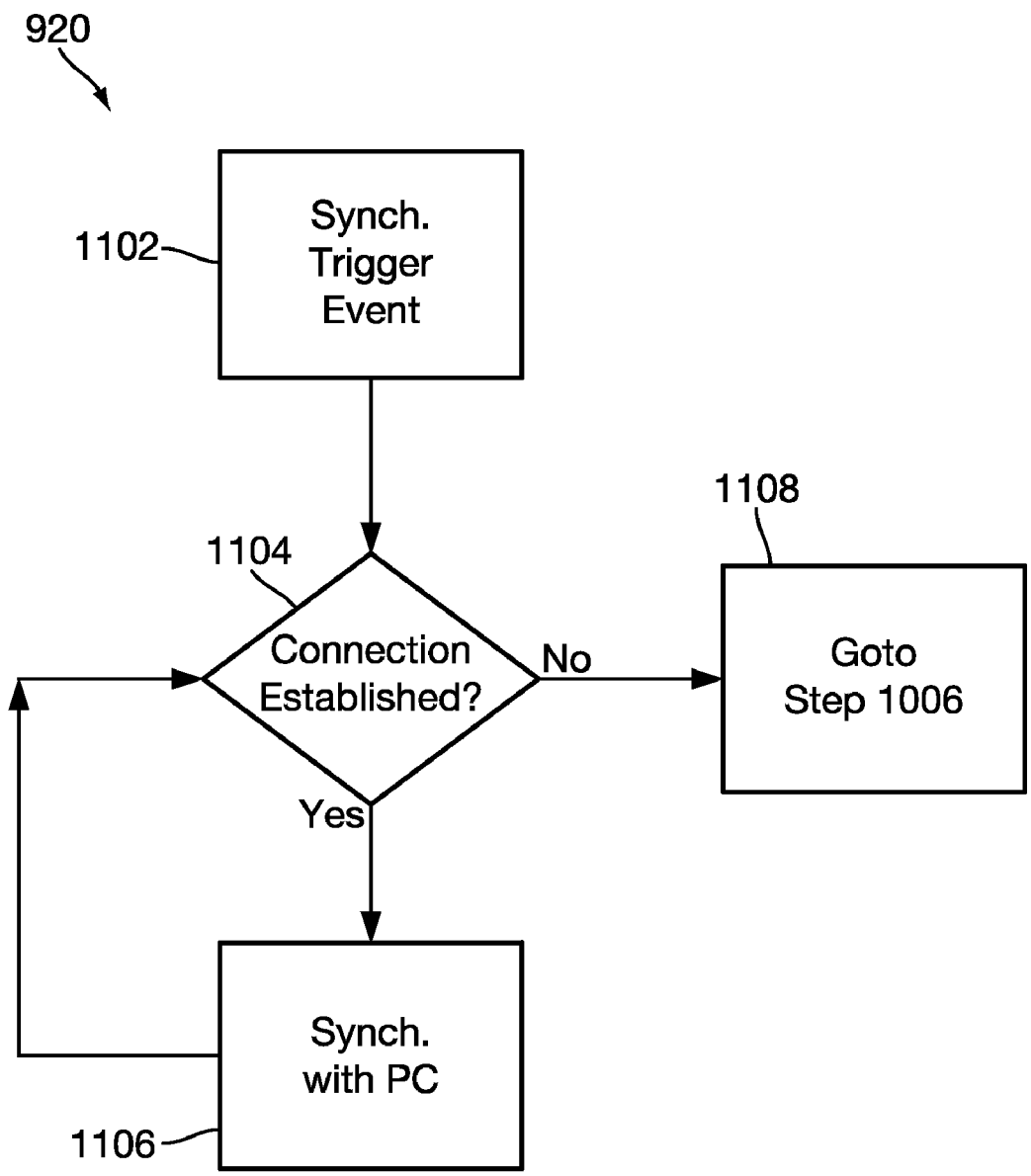
FIG. 11 is a flow diagram of a preferred embodiment of a process for automatically synchronizing with a computer.

Referring to FIG. 11, which is a preferred embodiment of a process for synchronizing motor vehicle 100 with computer 102, the preferred process begins with step 1102 where a synchronizing trigger event is received. After the triggering event has been received in step 1102, the process moves to step 1104 where the process determines if a connection with computer 102 has been established. If no connection has been established, then the process proceeds to step 1108 where an attempt to connect with computer 102 is made. Preferably, the process moves to step 1006 of process 910 as shown in FIG. 10 where an attempt to contact computer 102 is made. Process 910 continues until contact is made or the connect timer in step 1010 has expired. Returning to FIG. 11, if a connection with computer 102 has been established in 1104, then the process moves to step 1106 where various resources and/or accessories of motor vehicle 100 synchronize with computer 102. There are many different synchronizing routines and methods available. However, the systems and methods disclosed in U.S. Pat. No. 7,685,158, now U.S. patent application Ser. No. 10/867,208 filed on Jun. 15, 2004, and U.S. Pat. No. 7,456,7028, now U.S. patent application Ser. No. 10/867, 218 filed on Jun. 15, 2004, both being incorporated by reference in their entirety herein and both being assigned to the same assignee as the present application, are preferably used.

Figures 12, 13:
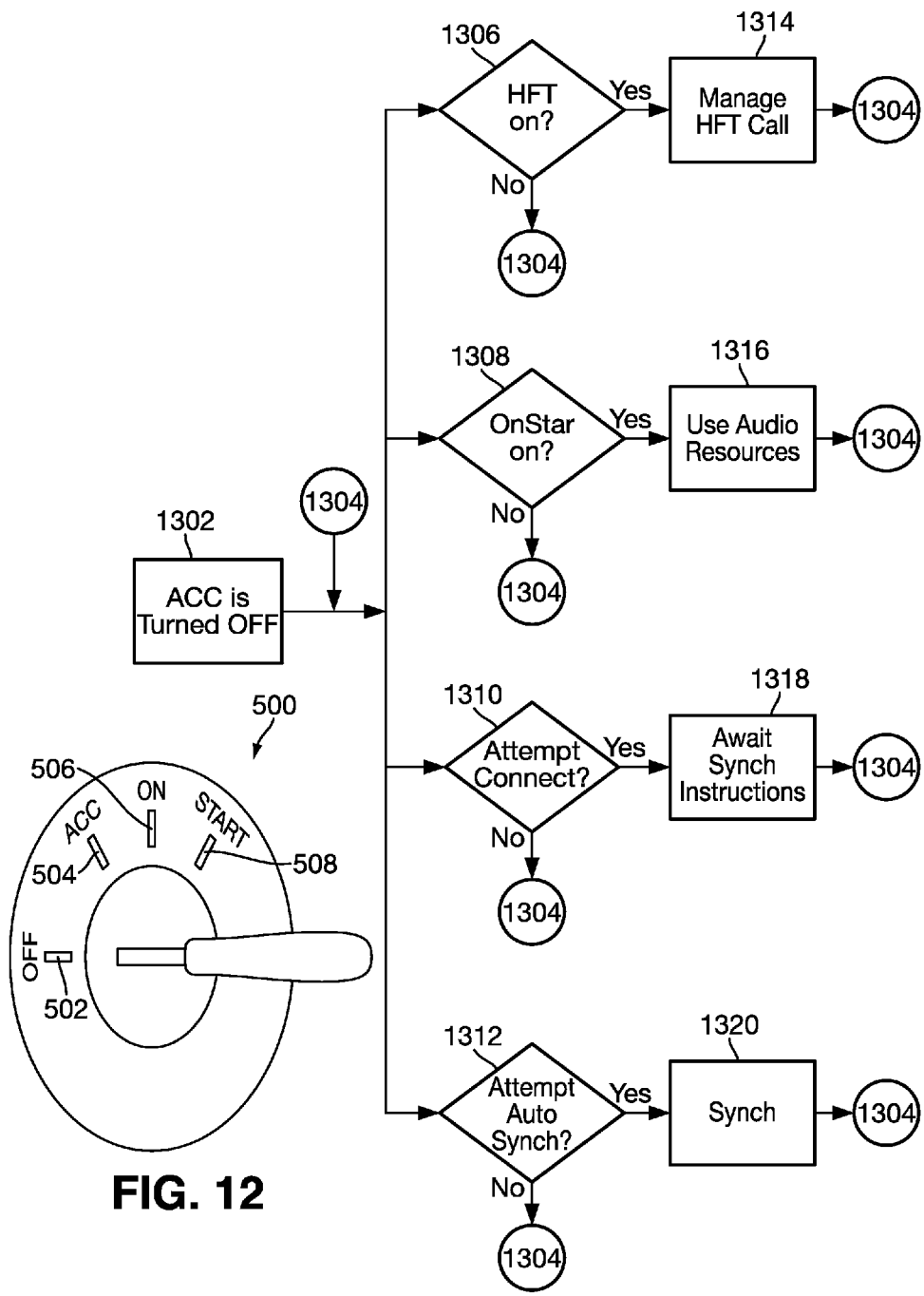
FIG. 12 is a schematic diagram of a preferred embodiment of an ignition switch in an "off" position.
FIG. 13 is a flow diagram of a preferred embodiment of a process associated with an "off" state.

FIG. 12 is a schematic of a preferred embodiment of ignition switch 500. In FIG. 12, ignition switch 500 is in the off 502 position. FIG. 13 is a flow diagram of a preferred embodiment of a process for managing power after motor vehicle 100 has been turned or switched off. The process begins with step 1302 where engine 122 of motor vehicle 100 is turned off.

FIG. 12 is a schematic diagram of a preferred embodiment of an ignition switch 500. In FIG. 12, ignition switch 500 is shown in an off position 502. In this position, engine 122 of motor vehicle 100 is preferably not running and actively generating electricity for the electrical accessories associated with motor vehicle 100.

FIG. 13 is a flow diagram of a preferred embodiment of a process for managing power after motor vehicle 100 has been turned or switched off. The process begins with step 1302 where engine 122 of motor vehicle 100 is turned off. Referring to FIGS. 7 and 13, in step 704 the motor vehicle 100 is transitioned from "on" state 702 to an "off" state 706 by a transition state 704 where the engine 122 of motor vehicle 100 is turned off. After motor vehicle 100 has been turned off, various resources and accessories associated with motor vehicle 100 continue to be available for use while other resources and accessories may not be available for use. All of the resources and features shown in FIG. 13 are optional and can be included or excluded from various different embodiments.

In some embodiments motor vehicle 100 includes provisions to support the use of a hands-free telephone. If this feature is provided, motor vehicle 100 can include step 1306 where motor vehicle 100 senses or determines whether a hands-free telephone has been activated or is currently activate. In step 1306, if a hands-free telephone associated with motor vehicle 100 has been activated, motor vehicle 100 can provide resources to support hands-free telephone calls in step 1314.

In some embodiments, motor vehicle 100 supports hands-free telephone calls by providing audio resources to receive voice information from the user and to provide audio output to the user. These resources can help to facilitate hands-free telephone calls. These audio resources can include a microphone shown schematically as 318 in FIG. 3 and shown schematically as microphone 414 in FIG. 4, and an amplifier and speaker 322 (see FIG. 3). Other embodiments can use different resources to support hands-free telephone calls, with some embodiments using a personal wireless network, for example, Bluetooth™ to support hands-free telephone calls.

While the hands-free telephone call is in progress, and while motor vehicle 100 assists in facilitating the hands-free telephone call in step 1314, the process can return to step 1304 where additional processes or features can operate simultaneously with the hands-free telephone call.

Some embodiments include provisions to facilitate communications between motor vehicle 100 and third wireless network 130. If these provisions are provided, motor vehicle 100 can include step 1308 where motor vehicle 100 determines if communications between motor vehicle 100 and third wireless network 130 have been requested or are occurring. In an exemplary embodiment, third wireless network 130 is a wireless network that is provided by a different service provider than the service provider of second wireless network 108. In an exemplary embodiment, third wireless network 130 is a communications and assistance network. One example of third wireless network 130 is the AcuraLink™ Assist network.

In step 1316, motor vehicle 100 can provide resources to support communications with third wireless network 130. In some embodiments, motor vehicle 100 uses similar audio resources to support VAN calls as conventional hands-free telephone calls. However, in other embodiments, VAN calls are supported by their own audio resources. In those embodiments where different resources are used to support VAN calls as conventional hands-free telephone calls, different microphones, speakers and amplifiers can be provided.

In some embodiments, communications with third wireless network 130 take priority over communications with second wireless network 108. In these embodiments, if a VAN call is made or received by motor vehicle 100, resources supporting calls made to or from second wireless network 108 are either suspended or terminated and those resources are devoted to supporting VAN calls in step 1316. In other embodiments both calls can exist concurrently. The following commonly owned patent application disclose systems and methods that can be used to manage multiple hands-free telephone calls: U.S. patent application publication number US-2005-0075128-A1 to Diedrich et al., the entirety of this application is hereby incorporated by reference. In some embodiments, the systems and methods disclosed in the '128 Diedrich application can be used with embodiments of the present invention. While motor vehicle 100 is devoting resources to support the VAN call in 916, the process can return to step 904 where additional features or accessories can simultaneously operate.

Some embodiments include provisions that allow motor vehicle 100 to communicate with first wireless network 106. As disclosed above, first wireless network 106 can be a packet switched network that is configured to communicate with a home computer or personal computer 102. In those embodiments where motor vehicle 100 includes provisions to communicate with first wireless network 106, motor vehicle 100 can include a step 1312 where motor vehicle 100 attempts to synchronize with personal computer 102 via first wireless network 106.

Figure 15:
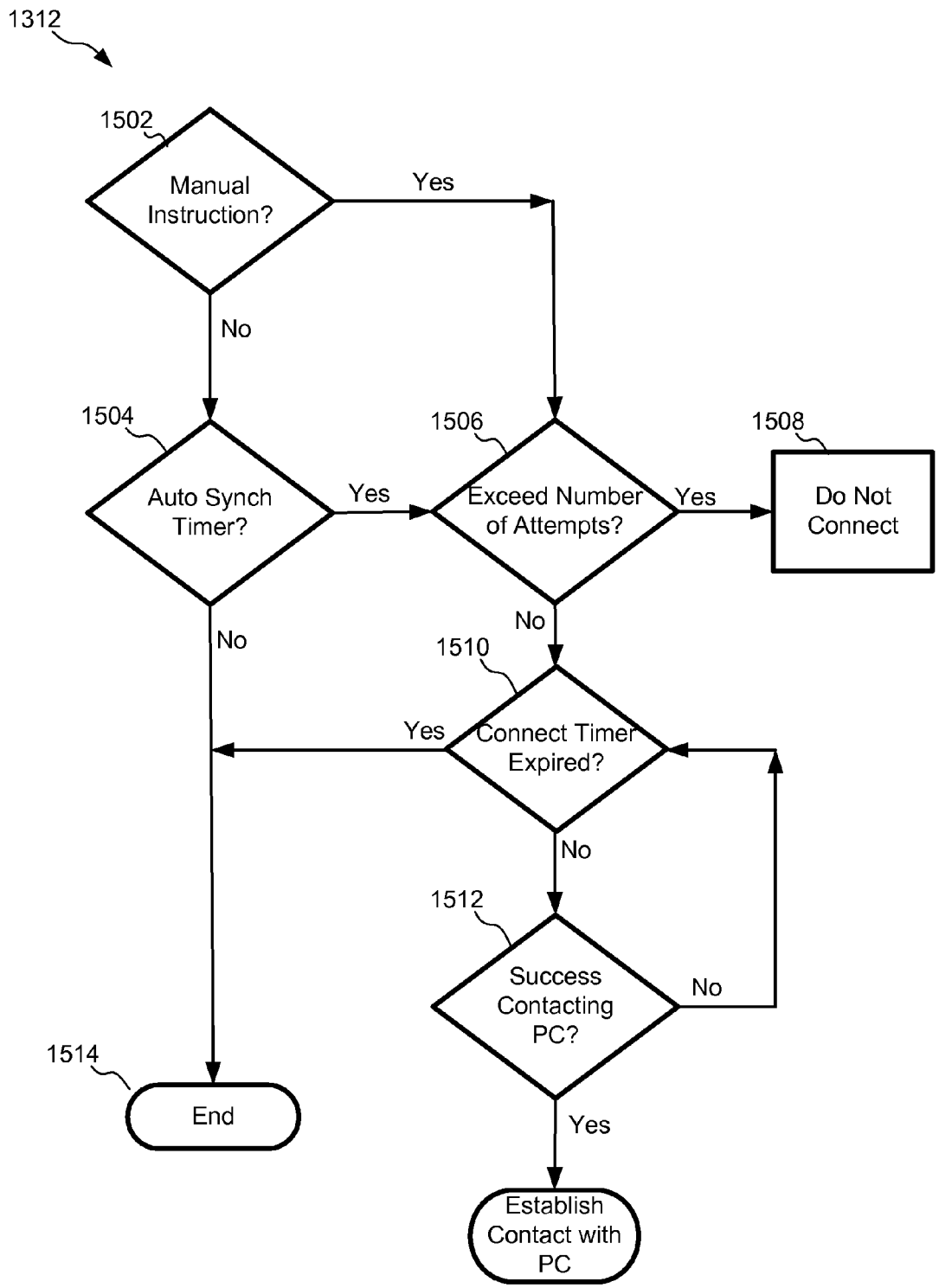
FIG. 15 is a flow diagram of a preferred embodiment of a process for attempting to automatically synchronize with a computer when a motor vehicle is in an "off" state.

Although many different algorithms or processes can be used to assist in synchronizing resources, files, directories, data or other information associated with motor vehicle 100 and computer 102, the following process shown in FIG. 15 is preferred. FIG. 15 is a flow diagram of a preferred embodiment of a method for determining the availability of communications between motor vehicle 100 and computer 102. Process 1312 preferably starts with step 1502 where the process determines if a manual instruction to connect with computer 102 has been received.

This manual instruction can take on many different forms. In some embodiments, different acts or events can all be interpreted by motor vehicle 100 as a manual instruction. In some embodiments, the act of locking one or more doors 128 of motor vehicle 100 can be interpreted by motor vehicle 100 as a manual instruction to attempt to connect to computer 102. In some embodiments, the event where motor vehicle 100 loses communications or loses wireless contact with computer 102 can be interpreted as a manual instruction to attempt to contact, connect or communicate with computer 102.

In some embodiments, a manual request to attempt to contact computer 102 can be interpreted by motor vehicle 100 as a manual instruction to attempt to contact computer 102. This manual request can take the form of receiving information from a button or switch designated to initiate contact computer 102. This button or switch can also be designated as a synchronize instruction as disclosed below. Any of these acts or instructions can be interpreted by motor vehicle 100 as a manual instruction to attempt to contact computer 102.

In some embodiments, multiple different acts or events can serve as a manual instruction to contact computer 102. For example, the act of locking a door, the event where a connection between motor vehicle 100 and computer 102 is lost and/or the receipt of a manual request can all act as a manual instruction to contact computer 102. In step 1502, if a manual instruction is received, the process moves to step 1506 where an attempt to contact computer 102 is made. However, if no manual instruction is received in step 1502, the process moves to step 1504 where motor vehicle 100 determines if an automated process has requested contact or communications with computer 102.

In the embodiment shown in FIG. 15, step 1504 is associated with an automatic synchronized timer. This automatic synchronized timer can be used to transfer information between motor vehicle 100 and computer 102 at regular and/or predetermined intervals. In one example, motor vehicle 100 includes a database that is regularly updated with information from computer 102. This database associated with motor vehicle 100 can include navigation information and/or entertainment information. In some embodiments, entertainment information includes one or more music or audio files.

In step 1504, if an automatic synchronize process has been established, process 910 determines if the audio synchronize timer requests connection or contact with computer 102. If such an automatic synchronize request has been received, process 910 moves to step 1006 where an attempt is made to contact computer 102. However, if the automatic synchronize process has not been established or an established automatic synchronize process has not requested contact or communications with computer 102, then the process moves to step 1012 where the process is ended and contact with computer 102 has not been established.

Returning to step 1506, motor vehicle 100 attempts to contact computer 102. Preferably, the process limits the number of attempts made by motor vehicle 100 to synchronize with computer 102. This helps to avoid a situation where motor vehicle 100 continues in vain to contact computer 102 when motor vehicle 100 is located out of range of first wireless network 106. An example of this is where first wireless network 106 is located close to a home where computer 102 is located and motor vehicle 100 has been parked for several days at an airport parking lot while the owner of motor vehicle 100 has traveled out of town on business. Another example is when motor vehicle 100 is within range of first wireless network 106, but for some reason, computer 102 is not available. Computer 102 may be turned off or not functioning.

In these situations, continuous attempts to synchronize with computer 102 would be unsuccessful and would drain battery 334 or battery 336 (see FIG. 3). To avoid these future unsuccessful attempts, process 1312 preferably includes a step where the number of attempts to connect with computer 102 is limited. Any suitable number of attempts can be selected, however, a number of attempts between 1 and 10 is preferred. In an exemplary embodiment, step 1506 allows three attempts to contact computer 102. After those three attempts, process 1312 assumes that motor vehicle 100 is out of range or computer 102 is unavailable.

Thus, in step 1506, process 1312 determines if the number of attempts has been exceeded. If the number of attempts to contact computer 102 has been exceeded, the process moves to step 1508 where the process no longer attempts to connect and further attempts to connect are ceased. In some cases, motor vehicle 100 can provide an indication that connection or communications with computer 102 has failed. If, however, the number of attempts has not been exceeded, then the process moves to step 1510.

In those embodiments that include a connect timer, the connect timer can establish a period of time where repeated attempts to contact computer 102 is made. In some embodiments, the connect timer can be any time from zero to 10 minutes; however, in an exemplary embodiment, the connect timer is set to about one minute. During this one minute period of time, motor vehicle 100 attempts to contact computer 102, and if unsuccessful, continues to attempt contact with computer for about one minute. After the preferred one minute period, the connect timer expires in step 1510 and motor vehicle 100 no longer attempts contact with computer 102. From there, the process moves to step 1508 where contact with computer 102 has not been established. If, however, the connect timer has not expired in step 1510, the process moves to step 1512 where it is determined if motor vehicle 100 has been successful in contacting computer 100.

If contact is successful in step 1512, then the process moves to step 1320 (see FIG. 13) where motor vehicle 100 either initiates communication with computer 102 or waits for computer 102 to initiate communication in order to conduct a synchronization procedure. If contact is unsuccessful in step 1510, then the process moves to step 1514 where synchronization with computer 102 has failed for that attempt routine. Of course process 1312 can be executed again in the future and additional synchronization attempts can be made later.

Returning to FIG. 13, another optional process that can be associated with motor vehicle 100 is an automatic synchronize process. In embodiments that include an automatic synchronize process, motor vehicle 100 preferably includes step 1312 where motor vehicle 100 determines if a request or command to automatically synchronize has been received or established. If a request or command to automatically synchronize has been received, the process moves to step 1320 (see FIG. 13) where motor vehicle 100 synchronizes with computer 102.

Figure 16:
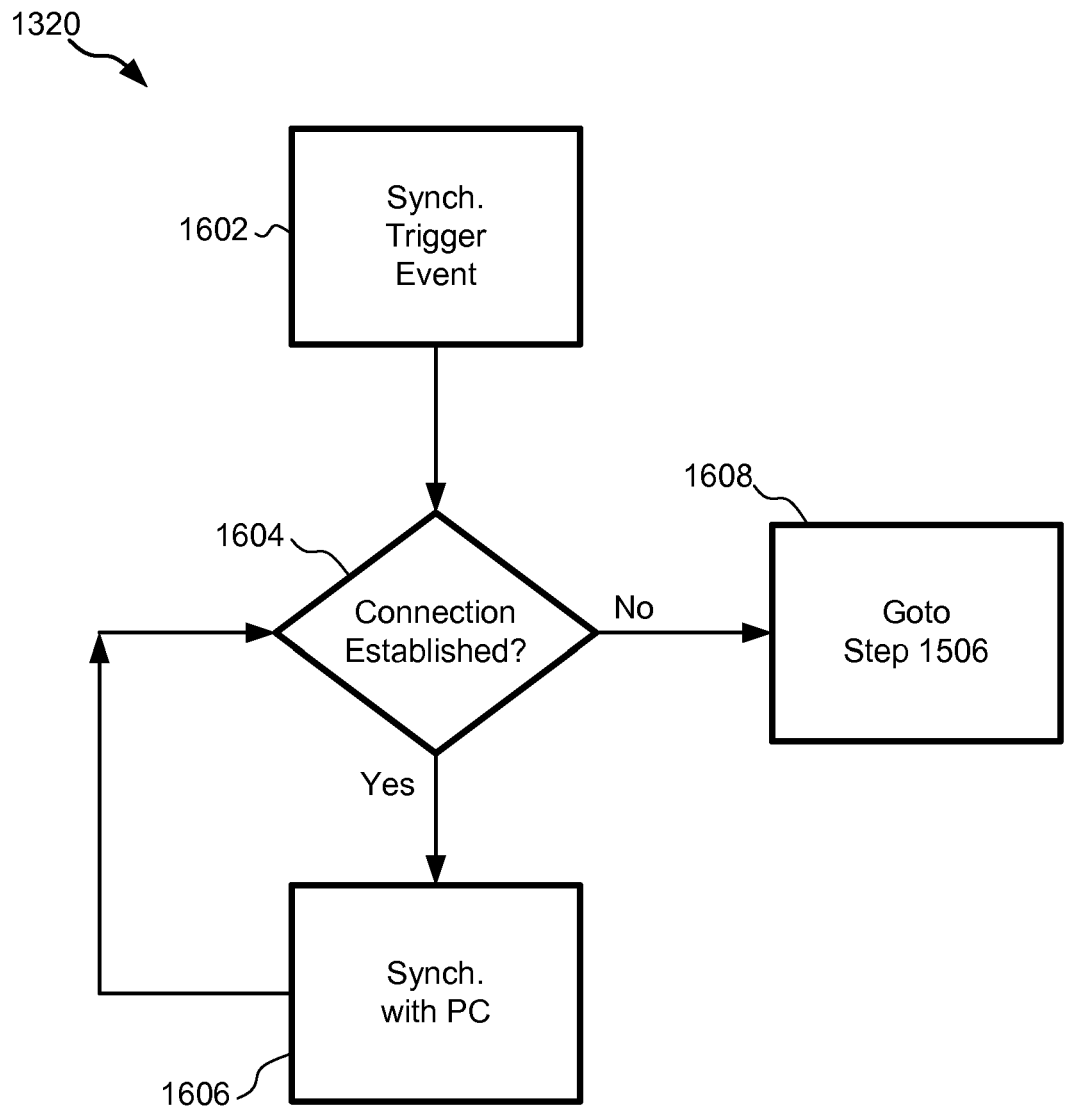
FIG. 16 is a flow diagram of a preferred embodiment of a process for automatically synchronizing with a computer.

Referring to FIG. 16, which is a preferred embodiment of a process for synchronizing motor vehicle 100 with computer 102, the preferred process begins with step 1602 where a synchronizing trigger event is received. After the triggering event has been received in step 1602, the process moves to step 1604 where the process determines if a connection with computer 102 has been established. If no connection has been established, then the process proceeds to step 1608 where an attempt to connect with computer 102 is made. Preferably, the process moves to step 1506 of process 1312 as shown in FIG. 15 where an attempt to contact computer 102 is made. Process 1310 continues until contact is made or the connect timer in step 1510 (see FIG. 15) has expired.

Returning to FIG. 16, if a connection with computer 102 has been established in 1604, then the process moves to step 1606 where various resources and/or accessories of motor vehicle 100 synchronize with computer 102. There are many different synchronizing routines and methods available. However, the systems and methods disclosed in U.S. Pat. No. 7,685,158, now U.S. patent application Ser. No. 10/867,208 filed on Jun. 15, 2004, and U.S. Pat. No. 7,457,028, now U.S. patent application Ser. No. 10/867,218 filed on Jun. 15, 2004, both being incorporated by reference in their entirety herein and both being assigned to the same assignee as the present application, are preferably used.

Figure 14:
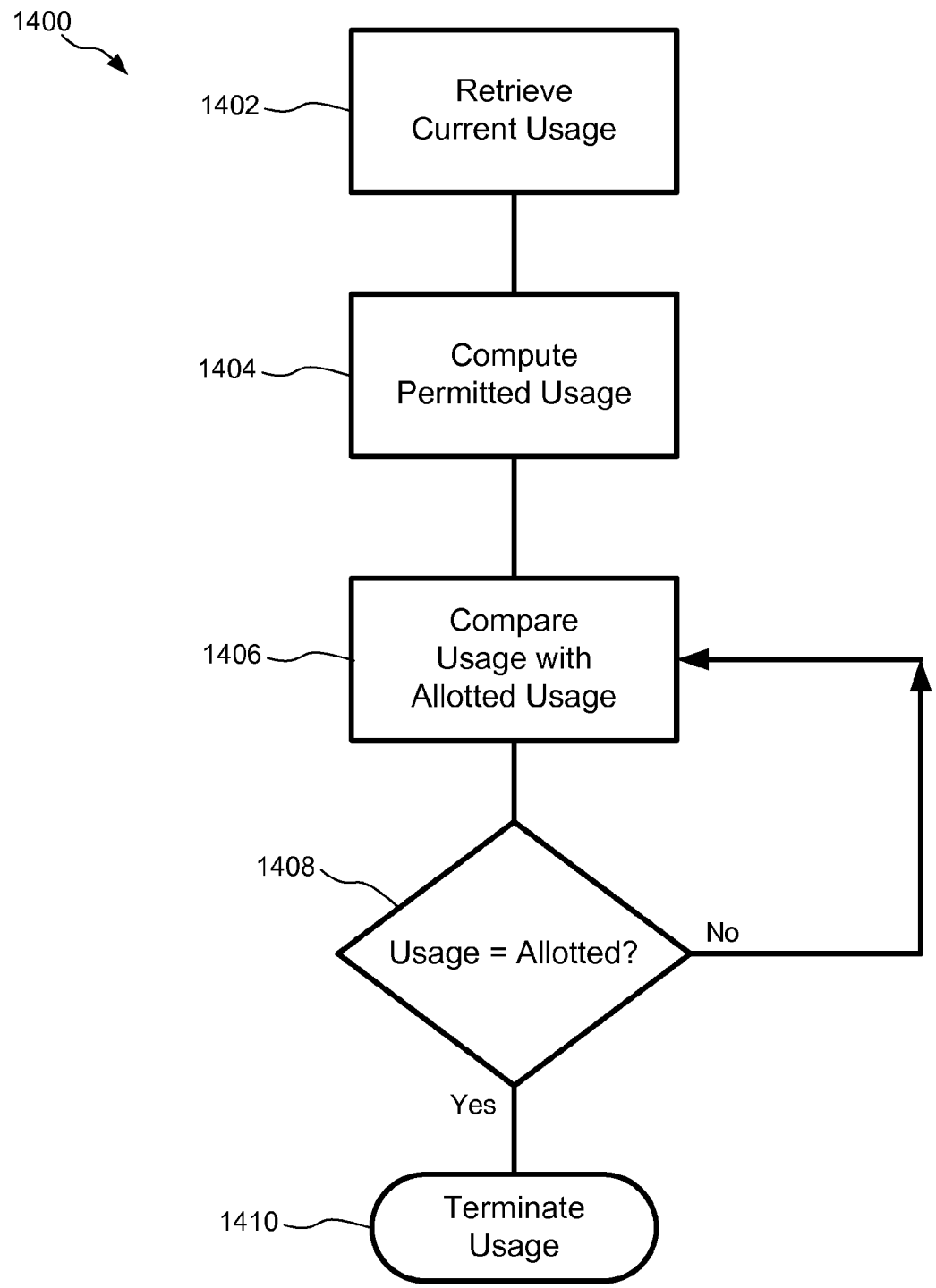
FIG. 14 is a flow diagram of a preferred embodiment of a method or process for managing an HFT call.

FIG. 14 is a flow diagram of a preferred embodiment of a method for managing the power reserves of battery 334 (see FIG. 3). Preferably, the process begins in step 1402 where a current usage log is retrieved. This current usage log contains information related to how much power has been consumed by the various resources and/or accessories associated with motor vehicle 100 and the duration of those uses. In those cases where motor vehicle 100 has just been turned off, the current log will not have any entries and the current log may have an initial starting value.

Preferably, the usage log is reset and commences when the engine 122 of motor vehicle was switched off in step 1302. After usage log information has been retrieved in 1402, the process moves to step 1404 where the process computes the remaining time available for using the various devices, accessories and systems associated with motor vehicle 100. Preferably, the current drawn by a device or accessory is estimated. Using this estimated current draw, process 1400 considers the amount of energy needed to cold start motor vehicle 100 and establishes a predetermined usage limit.

This predetermined usage limit prevents a device, accessory or resource from operating so long that it would deplete battery 334 to the point where battery 334 would not be able to cold start motor vehicle 100. It should be noted that different devices and accessories will require different levels of power to operate, and process 1400 is aware of those differences.

The following example illustrates the operation of process 1400 in a hypothetical situation. Assume that battery 334 of motor vehicle 100 has a capacity, at full charge, of 900 cold cranking amps. Also assume that motor vehicle 100 requires a minimum of 600 amps to cold start the engine. Given the battery capacity and the cold start requirements of the engine, battery 334 has about 300 amps of excess capacity after the engine has been switched off. In this case, the predetermined usage limit could be set at 300 amps or some number below 300 amps to provide a margin of safety. In this example, it is assumed that the predetermined usage limit has been set at 200 amps used. In other words, the predetermined usage limit maintains battery 334 at 700 amps or above. This provides a 100 amp safety margin to conduct a cold start.

Given a predetermined usage limit of 200 amps, process 1400 monitors all of the activities of all of the devices, accessories and systems of motor vehicle 100 to insure that a maximum of 200 amps is used after the engine has been switched off.

Given the various different power requirements of the various devices, process 1400 computes the time or activity duration permitted by a device or accessory. In other words, process 1400 retrieves a predetermined usage parameter associated with a device, accessory or resource. This usage parameter is related to the amount of energy typically consumed by the resource. For example, if a hands free telephone requires 0.5 amps to operate, then the usage parameter for the telephone would be 0.5 amps. The predetermined usage limit would be 400 minutes, because that is how long it would take the telephone to consume or use 200 amps.

In step 1406, the actual usage is compared with an allotted usage. In some cases, the elapsed time or activity is compared with the remaining time or permitted activity duration determined in step 1404. In step 1408, the process decides if the actual usage equals the allotted usage. In some cases, this means that the elapsed time equals the remaining time. In the case of an activity, process 1400 determines if the current number of activities equals the permitted number of activities. If the lapsed time does not equal the remaining time or if the number of activities is lower than the permitted number of activities, then process 1400 returns to step 1406 where usage is again compared with the allotment. In some cases, elapsed time is again compared with the remaining time or the current number of activities is compared with the number of permitted activities in step 1408. However, in step 1408 if the usage equals the allotment, then process 1400 moves to step 1410 where the usage is terminated.

In those cases where a communication resource is being used, process 1400 determines if the elapsed time equals the remaining time in step 1408. If an activity is being considered, process 1400 determines of the current activity is equal to the permitted number of activities. Process 1400 is repeated for every different device, accessory or resource that is used or turned on after motor vehicle 100 has been turned off.

Preferably, in a specific example related to the use of a hands free telephone, motor vehicle 100 permits a user to use the hands-free telephone and the associated accessories and resources to support a hands-free telephone call for a certain predetermined period while motor vehicle 100 is in the off condition. Preferably the time duration is selected so that maximum use of the time duration would deplete battery 334 (see FIG. 3) to some extent, but would leave battery 334 with enough power to contact a cold start of engine 122. Any time duration between zero and 120 minutes can be selected. However, in an exemplary embodiment, a time duration of about 35 minutes is selected. In other words, selecting a 35-minute time duration in the exemplary embodiment allow a user to use resources associated with conducting hands-free telephone calls for 35 minutes after engine 122 of motor vehicle 100 has been turned off. After 35 minutes, process 1400 prevents or prohibits continued use of the resources associated with conducting a hands-free telephone call.

In step 1316, motor vehicle 100 permits the use of resources to conduct communications with third wireless network 130. In some embodiments, VAN calls are managed in a way that is similar to the way hands-free telephone calls are managed. In other words, a usage log is kept, and VAN calls are only permitted for a certain predetermined time duration after engine 122 of motor vehicle 100 has been turned off. However, in a preferred embodiment, there is no limitation placed on the availability of resources associated with conducting communications with third wireless network 130. In other words, when the user is conducting communications with third wireless network 130, preferably, the AcuraLink™ Assist network, the user is able to use all the resources associated with making the VAN call and no time limits are placed on that activity. While, in some cases, this may drain battery 334 (see FIG. 3) to the point where battery 334 is unable to provide enough power to conduct a cold start of engine 122, the VAN call may be an emergency call, and it may be beneficial to permit unlimited use of available resources to conduct such emergency telephone calls.

In some embodiments, process 1400 is related to a certain activity. Examples of activities include an attempt connect event, an attempt to synchronize event, or a synchronization event. These events or activities are compared with a permitted number of these activities in process 1400.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of managing power in a motor vehicle comprising the steps of:
   establishing a first predetermined usage parameter associated with a first resource;
   establishing a first predetermined usage limit associated with the first resource;
   tracking the usage of the first resource using the first predetermined usage parameter when the motor vehicle is in an off condition, the off condition being a condition where an engine of the motor vehicle is turned off and where an accessory switch of the motor vehicle is turned off;
   preventing usage of the first resource when the first predetermined usage parameter exceeds the first predetermined usage limit;
   wherein the first predetermined usage parameter is a number of attempts which have been made to connect with a specific computer that is physically separate from the motor vehicle when the motor vehicle is in the off condition; and
   wherein the first predetermined usage limit is a predetermined maximum number of attempts to connect with the specific computer that is physically separate from the motor vehicle when the motor vehicle is in the off condition.

2. The method according to claim 1, further comprising the steps of:
   establishing a period of time where repeated attempts are made to connect with the specific computer that is physically separate from the motor vehicle when the motor vehicle is in the off condition; and
   preventing additional attempts after the period of time has expired.

3. The method according to claim 2, wherein the period of time is less than 10 minutes.

4. The method according to claim 2, wherein the period of time is between 0 and 10 minutes.

5. The method according to claim 2, wherein the period of time is about 1 minute.

6. The method according to claim 1, wherein the predetermined maximum number of attempts is established over a time period.

7. The method according to claim 6, wherein the predetermined maximum number of attempts is less than 30 attempts per day.

8. The method according to claim 6, wherein the predetermined maximum number of attempts is between 2 and 15 attempts per day.

9. The method according to claim 6, wherein the predetermined maximum number of attempts is about 7 attempts per day.

10. The method according to claim 6, wherein the predetermined maximum number of attempts is less than 10 attempts per week.

11. The method according to claim 6, wherein the predetermined maximum number of attempts is less than 5 attempts per week.

12. The method according to claim 6, wherein the predetermined maximum number of attempts is about 2 attempts per week.

13. The method according to claim 1, wherein the first predetermined usage parameter is related to an amount of current draw from a battery by the first resource.

14. The method according to claim 13, wherein the first predetermined usage limit is related to an estimated power reserve to conduct a cold start.

15. A method of managing power in a motor vehicle comprising the steps of:
establishing a first predetermined usage parameter associated with a first resource;
establishing a first predetermined usage limit associated with the first resource;
tracking the usage of the first resource using the first predetermined usage parameter when the motor vehicle is in an off condition, the off condition being a condition where an engine of the motor vehicle is turned off and where an accessory switch of the motor vehicle is turned off;
resetting the first predetermined usage parameter when the motor vehicle is transitioned from the off condition to an on condition;
wherein the first predetermined usage parameter is a number of attempts which have been made to connect with a specific computer that is physically separate from the motor vehicle when the motor vehicle is in the off condition; and
wherein the first predetermined usage limit is a predetermined maximum number of attempts to connect with the specific computer that is physically separate from the motor vehicle when the motor vehicle is in the off condition.

16. The method according to claim 15, further comprising the steps of:
establishing a second predetermined usage parameter associated with a second resource;
tracking the usage of the second resource using the second usage parameter when the motor vehicle is in the off condition; and
establishing a second predetermined usage limit associated with the second resource.

17. The method according to claim 16, wherein the second predetermined usage parameter is an amount of time a hands free telephone has been used while the motor vehicle is in the off condition; and
wherein the second predetermined usage limit is a predetermined maximum amount of time the hands free telephone may be used while the motor vehicle is in the off condition.

18. The method according to claim 16, wherein the second predetermined usage parameter is a duration of time a synchronize process has operated when the motor vehicle is in the off condition; and
wherein the second predetermined usage limit is a predetermined duration of time the synchronize process may operate when the motor vehicle is in the off condition.

19. A method of managing power in a motor vehicle comprising the steps of:
establishing a first predetermined usage parameter associated with a first resource;
establishing a cumulative usage limit associated with the first resource;
sensing an on/off condition of the motor vehicle;
tracking the usage of the first resource using the first predetermined usage parameter when the motor vehicle is in an off condition,
restricting the use of the first resource after the first predetermined usage parameter exceeds the established cumulative usage limit;
wherein the first predetermined usage parameter is a number of attempts which have been made to connect with a specific computer that is physically separate from the motor vehicle when the motor vehicle is in the off condition; and
wherein the cumulative usage limit is a predetermined maximum number of attempts to connect with the specific computer that is physically separate from the motor vehicle when the motor vehicle is in the off condition.

20. The method according to claim 19, wherein the off condition is a condition where an engine of the motor vehicle is turned off.

21. The method according to claim 19, wherein the off condition is a condition where an accessory switch of the motor vehicle is turned off.

22. The method according to claim 19, wherein the cumulative usage limit is related to an estimated current draw for the first resource.

23. The method according to claim 19, wherein the cumulative usage limit is related to an estimated current draw from a battery that depletes a power reserve for the battery.

24. The method according to claim 23, wherein the power reserve is an estimated amount of power between a full power estimate and an estimated minimum level required for a cold start.

25. The method according to claim 19, wherein a second predetermined usage parameter associated with a second resource is established.

26. The method according to claim 25, wherein the second predetermined usage parameter is related to an estimated current draw for the second resource.

27. The method according to claim 26, wherein the estimated current draw for the second resource is different than the estimated current draw for the first resource.

28. The method according to claim 25, wherein the usage of the first resource and the second resource is tracked.

29. The method according to claim 28, wherein the usage of the second resource is restricted when the cumulative usage limit is exceeded.

30. The method according to claim 28, wherein the usage of the second resource is not restricted when the cumulative usage limit is exceeded.

31. The method according to claim 30, wherein the second resource is associated with a vehicle assistance network.

* * * * *